US012692885B2

(12) United States Patent
Wang et al.

(10) Patent No.: US 12,692,885 B2
(45) Date of Patent: Jul. 28, 2026

(54) POSITIONING SYSTEM AND METHOD OF USE THEREOF

(71) Applicant: FIVETECH TECHNOLOGY INC., New Taipei City (TW)

(72) Inventors: Ting-Jui Wang, New Taipei City (TW); Yuan-Mu Lu, New Taipei City (TW)

(73) Assignee: FIVETECH TECHNOLOGY INC., New Taipei City (TW)

( * ) Notice: Subject to any disclaimer, the term of this patent is extended or adjusted under 35 U.S.C. 154(b) by 743 days.

(21) Appl. No.: 17/709,452

(22) Filed: Mar. 31, 2022

(65) Prior Publication Data

US 2022/0316508 A1 Oct. 6, 2022

(30) Foreign Application Priority Data

Apr. 1, 2021 (TW) .................................. 110112250
Oct. 14, 2021 (TW) .................................. 110138149

(51) Int. Cl.
*F16B 5/06* (2006.01)
*G06F 1/185* (2026.01)
*H01R 12/72* (2011.01)
*H01R 13/73* (2006.01)

(52) U.S. Cl.
CPC ............ *F16B 5/0635* (2013.01); *G06F 1/185* (2013.01); *H01R 12/721* (2013.01); *H01R 13/73* (2013.01); *F16B 2200/40* (2018.08)

(58) Field of Classification Search
CPC .... F16B 5/0208; F16B 5/0621; F16B 5/0635; F16B 5/065; F16C 29/001; G06F 1/183;

G06F 1/184; G06F 1/185; G06F 1/186; H01R 12/721; H01R 13/73; Y10T 403/599; Y10T 403/602
USPC .................................................. 403/325, 327
See application file for complete search history.

(56) References Cited

U.S. PATENT DOCUMENTS

| | | | | |
|---|---|---|---|---|
| 2,161,694 A | * | 6/1939 | Becker .................... | F16G 11/08 |
| | | | | 439/820 |
| 5,697,802 A | * | 12/1997 | Kawabe ................. | H01R 12/83 |
| | | | | 439/326 |
| 6,095,827 A | * | 8/2000 | Dutkowsky ............ | H01R 12/57 |
| | | | | 439/83 |
| 6,210,194 B1 | * | 4/2001 | Choy ..................... | H01R 12/83 |
| | | | | 439/326 |
| 6,896,539 B2 | * | 5/2005 | Dobbs .................... | H05K 7/142 |
| | | | | 439/376 |
| 9,927,834 B2 | * | 3/2018 | Hua ........................ | G06F 1/185 |
| 11,445,629 B2 | * | 9/2022 | Hsieh ...................... | H05K 7/12 |

(Continued)

FOREIGN PATENT DOCUMENTS

| | | | | |
|---|---|---|---|---|
| CN | 111857258 A | * 10/2020 | ............. | G06F 1/185 |
| CN | 212381558 U | 1/2021 | | |

(Continued)

*Primary Examiner* — Josh Skroupa

(57) ABSTRACT

A positioning device includes a body. The body is adapted to be disposed on a first object. The first positioning member is movably connected to the body or a second positioning member. The second positioning member is movably connected to the body or the first positioning member, and the first positioning member is located between the second positioning member and the first object. The present disclosure further provides a method of use of a positioning device.

24 Claims, 26 Drawing Sheets

200

(56) References Cited

U.S. PATENT DOCUMENTS

| | | | | |
|---|---|---|---|---|
| 11,484,099 B2 * | 11/2022 | Wang | .................... | H05K 1/184 |
| 11,536,304 B2 * | 12/2022 | Garcia | ................. | F16B 5/0621 |
| 2020/0200216 A1 * | 6/2020 | Wang | ................... | F16B 5/0621 |

FOREIGN PATENT DOCUMENTS

| | | | | |
|---|---|---|---|---|
| FR | 2817927 A1 * | 6/2002 | ............. | F16B 5/065 |
| TW | 201620353 A | 6/2016 | | |
| TW | M542798 U | 6/2017 | | |
| TW | M545193 U | 7/2017 | | |
| TW | M560536 U | 5/2018 | | |
| TW | 202024491 A | 7/2020 | | |
| TW | M601157 U | 9/2020 | | |
| TW | M613176 U | 6/2021 | | |

* cited by examiner

200

POSITIONING SYSTEM AND METHOD OF USE THEREOF

CROSS-REFERENCE TO RELATED APPLICATION

This non-provisional application claims priority under 35 U.S.C. § 119(a) on Patent Application No(s). 110112250 filed in Taiwan, R.O.C. on Apr. 1, 2021 and Patent Application No(s). 110138149 filed in Taiwan, R.O.C. on Oct. 14, 2021, the entire contents of which are hereby incorporated by reference.

BACKGROUND OF THE INVENTION

1. Field of the Invention

The present disclosure provides a positioning technique, and in particular to a positioning device capable of quickly positioning a plurality of objects and a method of use thereof.

2. Description of the Related Art

A fixing component can be conventionally used to connect two parallel plates. The fixing component is usually implemented by a screw locking technique, and a specific implementation form thereof includes a screw and a sleeve to form a fixing member. One end of the screw has a force receiving portion that is provided with a screwdriver slot, and the other end has a screw rod connected to the force receiving portion. The sleeve is sleeved at the screw rod of the screw to allow the screw to move in the sleeve. Thus, the fixing member can be coupled to a first object (for example, a circuit board) using one end of the sleeve, and the screw rod of the screw can pass through one end of the sleeve and correspond to a lock hole of a second object (for example, a frame or a housing). A tool is then used to apply an external rotational force on the screwdriver slot of the force receiving portion of the screw, so as to lock the screw rod in the lock hole of the second object, thereby completing a combined structure of the first object and the second object that are connected and arranged in parallel.

However, the conventional connection method above involves a tool and this results in complicated and time-consuming assembly and removal processes.

BRIEF SUMMARY OF THE INVENTION

With extensive research and development, the applicant provides a positioning device and a method of use thereof in the aim of achieving the object of quickly and simply positioning a plurality of objects laterally one a first object.

A positioning device provided according to a first embodiment of the present disclosure includes a body. The body is adapted to be disposed on a first object. The first positioning member is movably connected to the body or a second positioning member. The second positioning member is movably connected to the body or the first positioning member, and the first positioning member is located between the second positioning member and the first object.

A positioning device provided according to a second embodiment of the present disclosure includes a body and a first positioning member. The first positioning member is movably connected to the body or a second positioning member. The second positioning member is movably connected to the body or the first positioning member, and the first positioning member is located between the second positioning member and the first object. A second object is adapted to cross the second positioning member and the first positioning member so as to arrange the second object on the body, and a third object is adapted to cross the second positioning member and be arranged on the first positioning member.

A positioning device provided according to a third embodiment of the present disclosure includes a body and a first positioning member. The body is adapted to be disposed on a first object. The first positioning member is movably connected to the body or a second positioning member, and includes an actuating portion or an actuated portion. The second positioning member is movably connected to the body or the first positioning member, the first positioning member is located between the second positioning member and the first object, the second positioning member includes an actuated portion or an actuating portion corresponding to the actuating portion or the actuated portion, a movement space is present between the actuated portion and the actuating portion, and the actuating portion and the actuated portion are for moving in a direction of the movement space.

A method of use of a positioning device provided according to the fourth embodiment of the present disclosure includes: disposing the body on the first object; configuring the second object to cross the second positioning member so as to be arranged on the first positioning member; alternatively, moving the first positioning member to arrange the second object on the body; alternatively, configuring the third object to cross the second positioning member so as to be arranged on the first positioning member.

A method of use of a positioning device provided according to a fifth embodiment of the present disclosure uses the positioning device above, and includes: disposing the body on the first object; moving the first positioning member and driving the second positioning member so as to arrange the second object on the body; or separately moving the second positioning member so as arrange a third object on the first positioning member.

Thus, the positioning device and the method of use thereof of the present disclosure are capable of quickly and simply assembling and removing the second object and the third object laterally on or from the first object.

DETAILED DESCRIPTION OF THE INVENTION

To facilitate understanding of the object, characteristics and effects of this present disclosure, embodiments together with the attached drawings for the detailed description of the present disclosure are provided.

Embodiments of the present disclosure are provided below.

Figure 1:
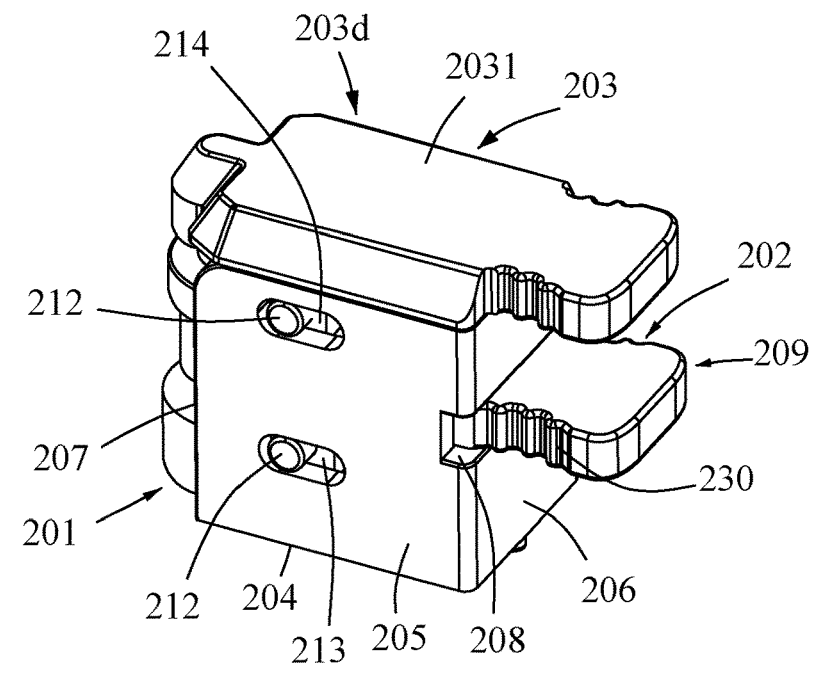
FIG. 1 is a first three-dimensional schematic diagram of a positioning device according to a specific embodiment of the present disclosure.
Figure 2:
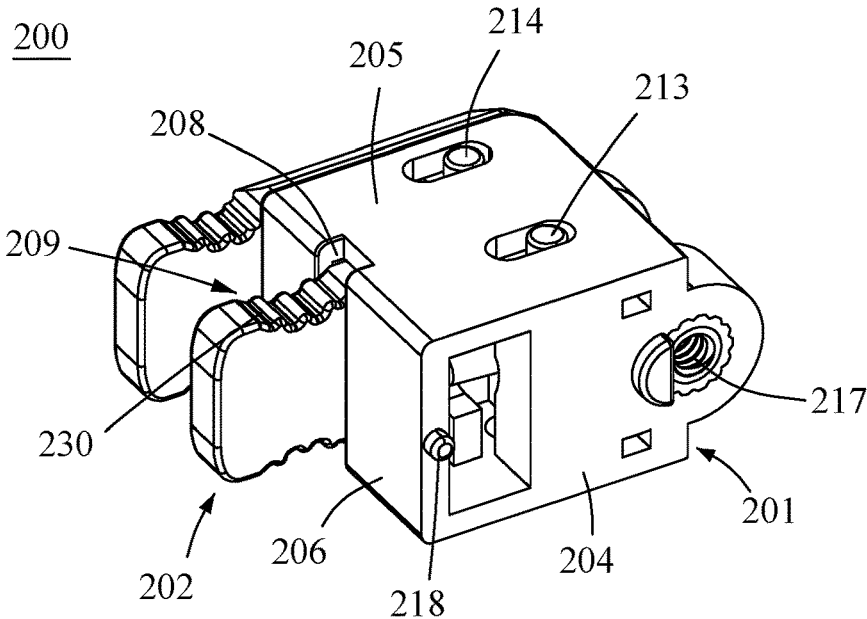
FIG. 2 is a second three-dimensional schematic diagram of a positioning device according to a specific embodiment of the present disclosure.
Figure 3:
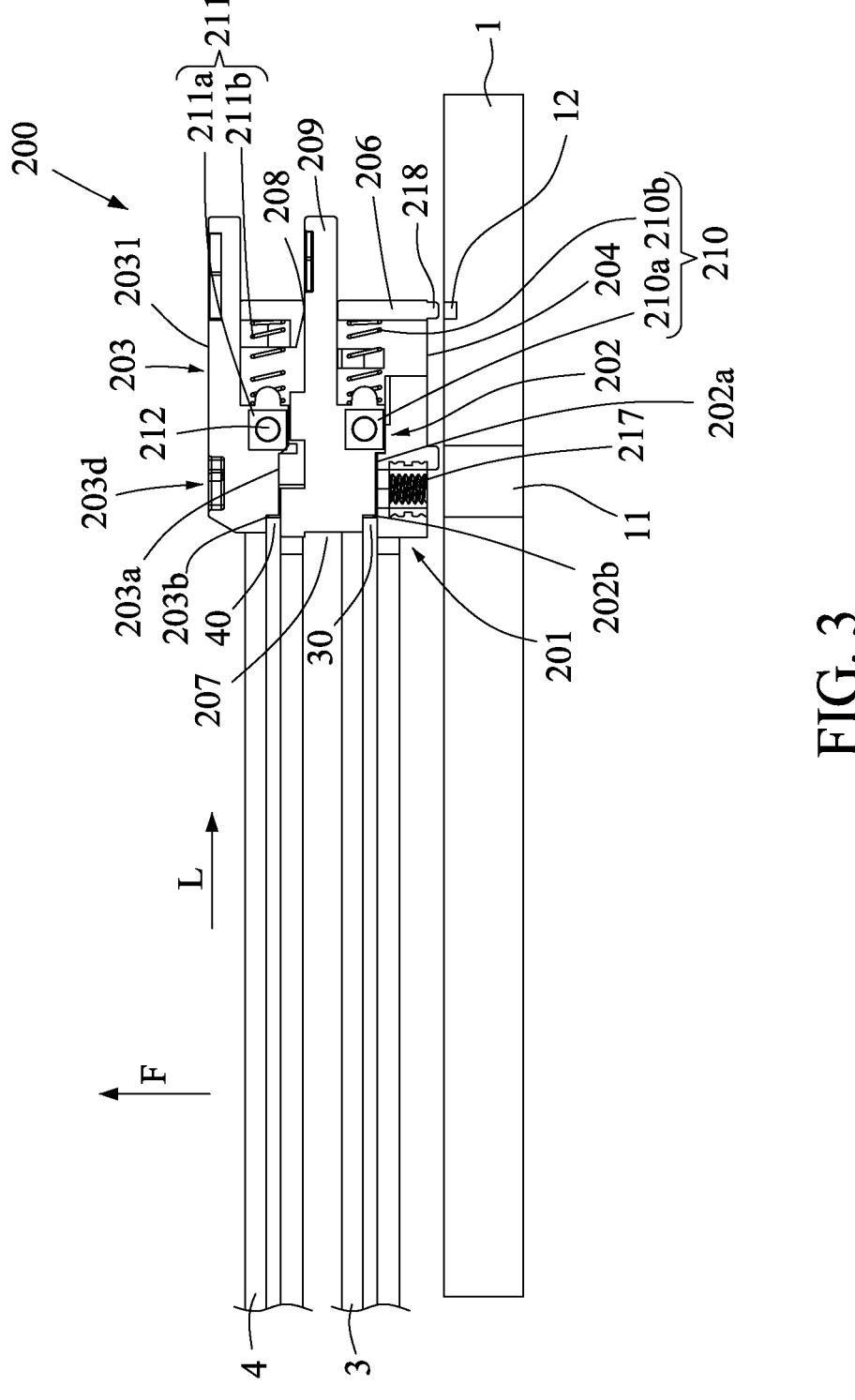
FIG. 3 is a section schematic diagram of a positioning device, a first object, a second object and a third object according to a specific embodiment of the present disclosure.

Referring to FIG. 1 to FIG. 3, a positioning device 200 provided according to an embodiment of the present disclosure includes a body 201, a first positioning member 202 and a second positioning member 203. The body 201 is adapted to be disposed on a first object 1. The first positioning member 202 is movably connected to the body 201 or the second positioning member 203. The second positioning member 203 is movably connected on the body 201. The first positioning member 202 is located between the second positioning member 203 and the first object 1. A second object 3 is adapted to cross the second positioning member 203 so as to be arranged on the first positioning member 202, the first positioning member 202 is adapted to move so as to arrange the second object 3 on the body 201, and a third object 4 is adapted to cross the second positioning member 203 and be arranged on the first positioning member 202. The first object 1, the second object 3 or the third object 4 may be a printed circuit board (PCB), a circuit board, a chip, a heat sink, a cooling fin, a connector, an iron part or a plastic part.

Referring to FIG. 1 to FIG. 3, in one embodiment, the first positioning member 202 is movably connected to the body 201 so as to be adapted to be disposed together with the body 201 on the first object 1. After the second object 3 is moved on the second positioning member 203 and is arranged on the first positioning member 202, the first positioning member 202 is adapted to move so as to arrange the second object 3 on the body 201 and in contact therewith, and a third object 4 is adapted to be moved on the second positioning member 203 so as to be arranged on the first positioning member 202 and in contact therewith. The first positioning member 202 and the second positioning member 203 are independently movable relative to each other on the body 201. Furthermore, one end of the second object 3 on the body 201 and one end of the third object 4 on the first positioning member 202 are aligned with each other (as shown in FIG. 3).

Referring to FIG. 1 to FIG. 3, in one embodiment, the first positioning member 202 is movably connected to the body 201 so as to be adapted to be disposed together with the body 201 on the first object 1. The second positioning member 203 is movably connected on the body 201. The second object 3 is for moving on the second positioning member 203 and the first positioning member 202 so as to arrange the second object 3 on the body 201, and the third object 4 is adapted to be moved on the second positioning member 203 and be arranged on the first positioning member 202.

Referring to FIG. 4 to FIG. 12, a method of use of a positioning device provided according to the third embodiment of the present disclosure includes: disposing the body 201 on the first object 1; configuring the second object 3 to push away or cross the second positioning member 203 so as to be arranged on the first positioning member 202; moving the first positioning member 202 to configure the second object 3 to fall on the body 201; and configuring the third object 4 to push away or cross the second positioning member 203 so as to be arranged on the first positioning member 202.

Referring to FIG. 4 to FIG. 12, in one embodiment, after the second object 3 is pushes away the second positioning member 203 and is arranged on the first positioning member 202, the second object 3 may be further configured to push away or cross the first positioning member 202 so as to arrange the second object on the body 201.

Referring to FIG. 4 to FIG. 12, in one embodiment, after the third object 4 pushes away or crosses the second positioning member 203 so as to be arranged on the second object 3, the second positioning member 203 returns to a positioning position so as to position the third object 4.

Thus, the positioning device 200 and the method of use thereof of the present disclosure are capable of quickly and simply assembling and removing the second object 3 and the third object 4 laterally on or from the first object 1.

Referring to FIG. 1 to FIG. 3, in one embodiment, the body 201 is adapted to be disposed on a surface 10 of a first object 1, wherein the surface 10 has a normal direction F. The first positioning member 202 may be elastically connected to the body 201 in a lateral direction L non-parallel to the normal direction F (for example, perpendicular to the normal direction F). The second positioning member 203 is elastically connected on the body 201 in the lateral direction L. The first positioning member 202 is located between the second positioning member 203 and the first object 1. A second object 3 is adapted to push away the second positioning member 203 in the lateral direction L so as to fall on the first positioning member 202, the first positioning member 202 is adapted to move along the lateral direction L so that the second object 3 falls on the body 201, and a third object 4 is adapted to push away the second positioning member 203 in the lateral direction L so as to fall on the first positioning member 202. The first object 1, the second object 3 and the third object 4 are, for example but not limited to, circuit boards, metal boards or plastic boards. The second object 3 and the third object 4 may be spaced by a gap G once having been positioned at the lateral positioning device 200. Two or all of the first object 1, the second object 3 and the third object 4 may be electrically connected to each other. The second object 3 or the third object 4 may be a circuit board, a plastic board, a memory card, an M.2 card, an integrated circuit card, a wafer module or a hard drive.

Referring to FIG. 4 to FIG. 12, in one embodiment, the method of use of the positioning device 200 of the present disclosure may include the following steps.

Figure 4:
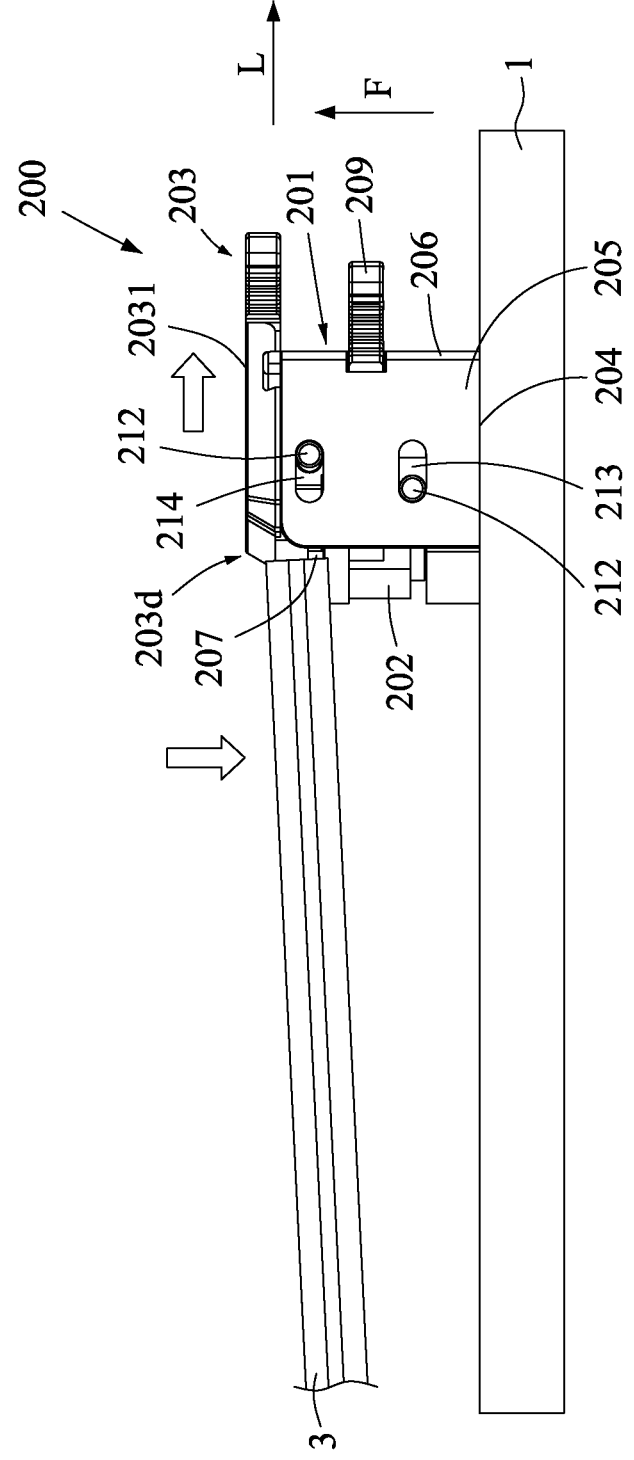
FIG. 4 is a first schematic diagram of operation of a positioning device, a first object and a second object according to a specific embodiment of the present disclosure.
Figure 5:
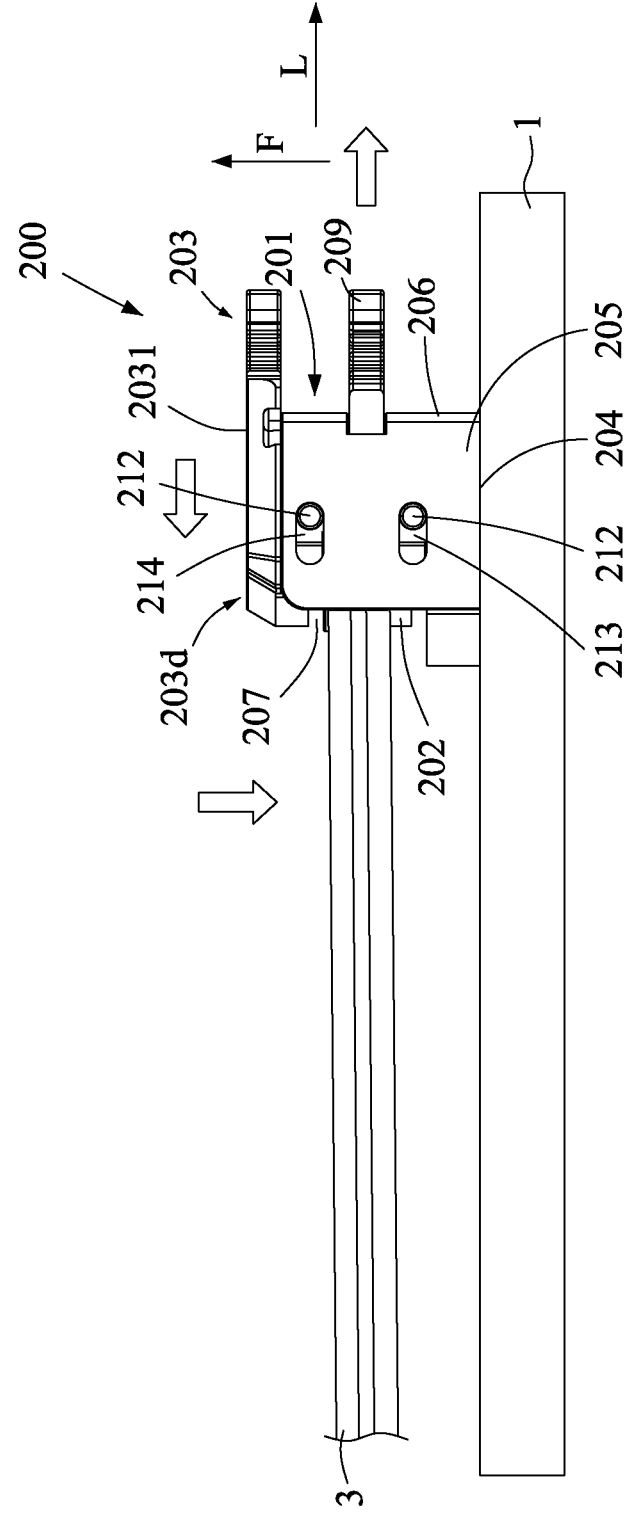
FIG. 5 is a second schematic diagram of operation of a positioning device, a first object and a second object according to a specific embodiment of the present disclosure.

In step 1, as shown in FIG. 4 and FIG. 5, the positioning device 200 is provided, the body is disposed on a first object 1, and the second object 3 is configured to push away the second positioning member 203 in the lateral direction L so as to fall on the first positioning member 202.

Figure 6:
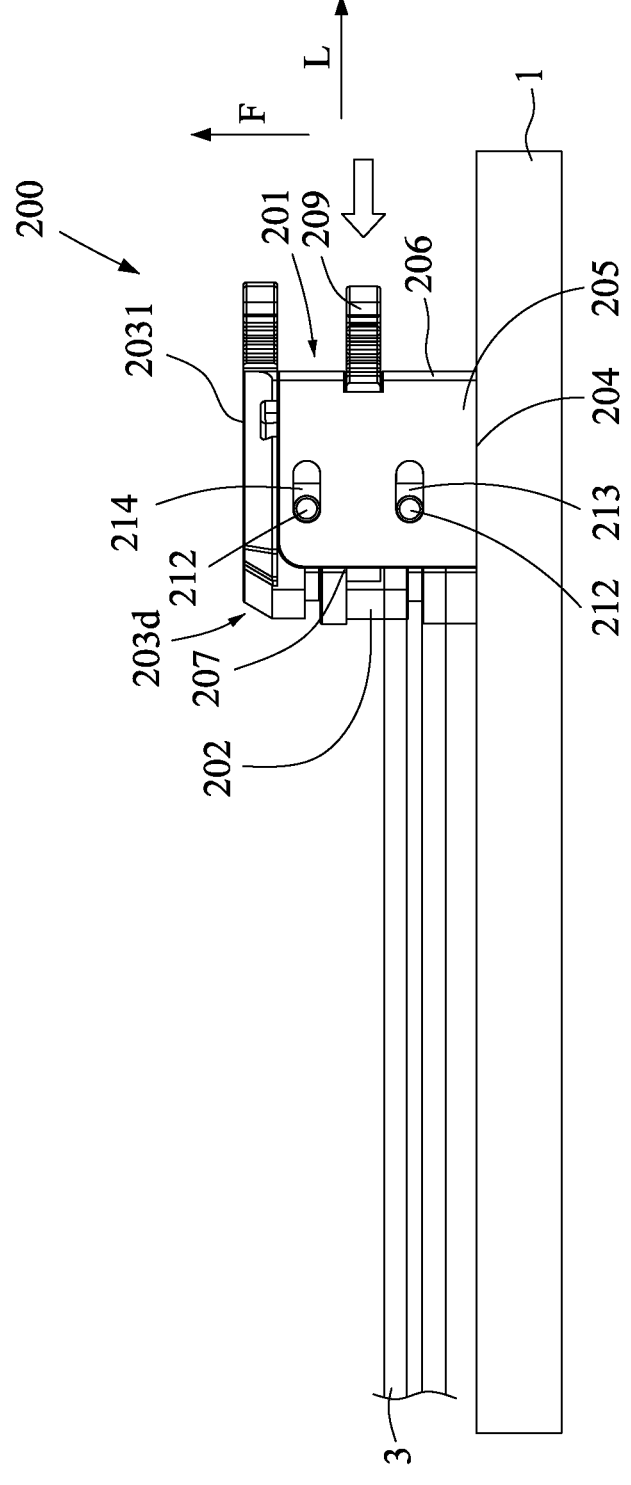
FIG. 6 is a third schematic diagram of operation of a positioning device, a first object and a second object according to a specific embodiment of the present disclosure.

In step 2, as shown in FIG. 6, the first positioning member 202 is moved along the lateral direction L so that the second object 3 falls on the body 201. After the second object 3 falls on the first positioning member 202, the second positioning member 203 may be elastically restored by an elastic element. The first positioning member 202 may be moved by a manual operation. Once the second object 3 falls on the body 201, the first positioning member 202 may be released so that the first positioning member 202 is elastically restored, thereby clamping the second object 3 between the body 201 and the first positioning member 202.

Figure 7:
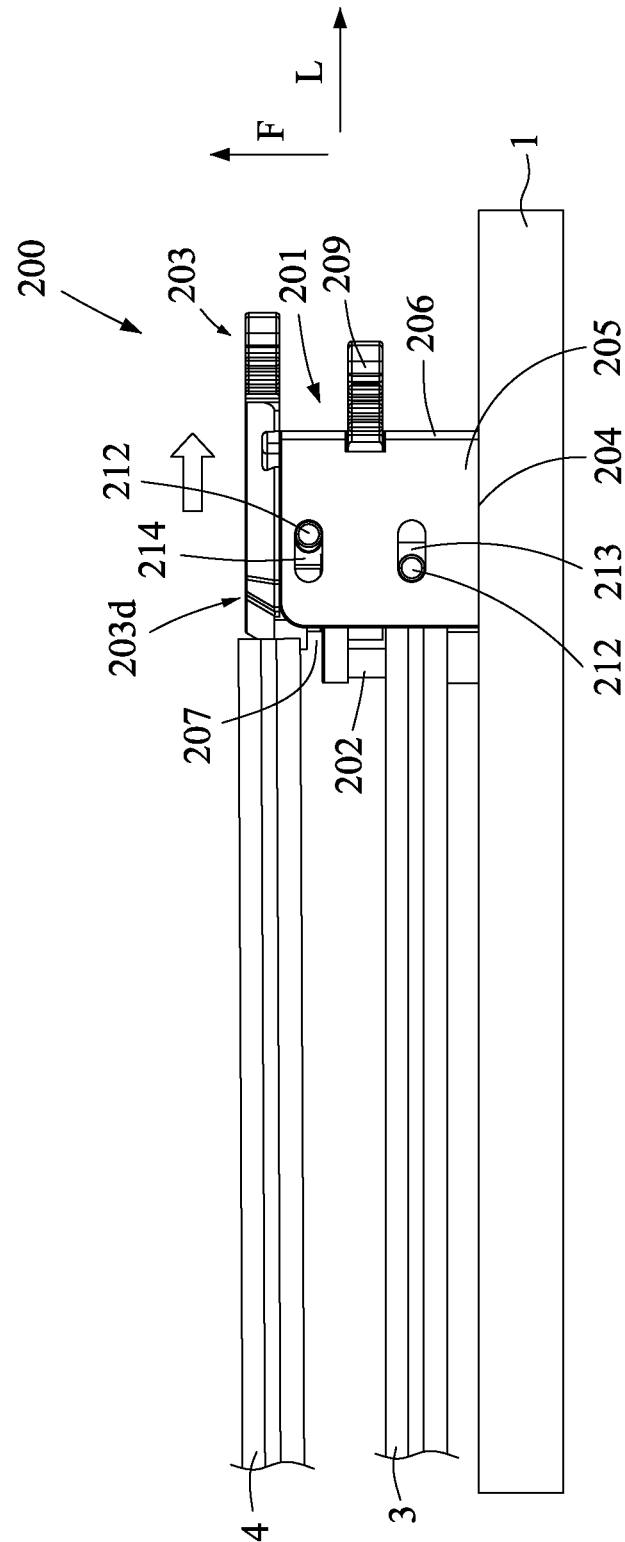
FIG. 7 is a first schematic diagram of operation of a positioning device, a first object, a second object and a third object according to a specific embodiment of the present disclosure.
Figure 8:
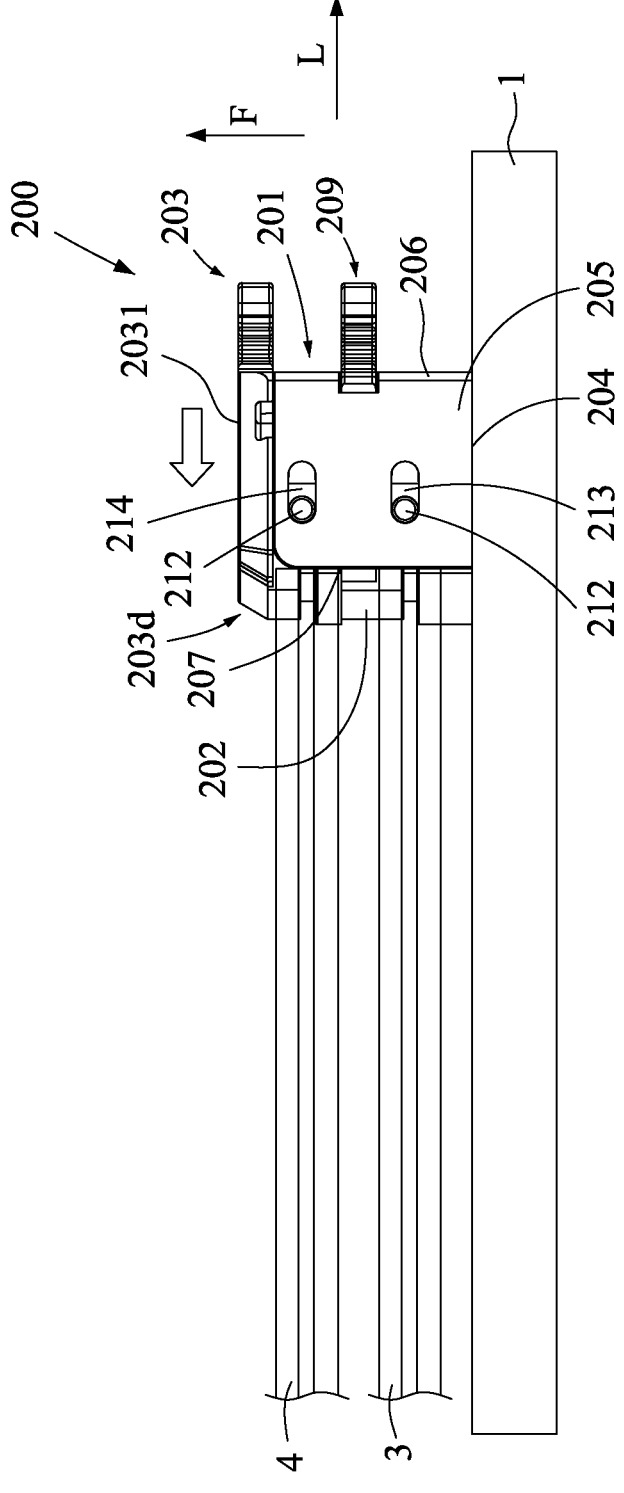
FIG. 8 is a second schematic diagram of operation of a positioning device, a first object, a second object and a third object according to a specific embodiment of the present disclosure.

As shown in FIG. 7 and FIG. 8, the third object 4 pushes away the second positioning member 203 in the lateral direction L so as to fall on the first positioning member 202. Once the third object 4 falls on the first positioning member 202, the second positioning member 203 may again be elastically restored by an elastic element, so as to clamp the third object 4 between the first positioning member 202 and the second positioning member 203. Specifically, once the third object 4 crosses the second positioning member 203 and falls on the first positioning member 202, the second positioning member 203 returns to a positioned position and positions the third object 4.

Figure 9:
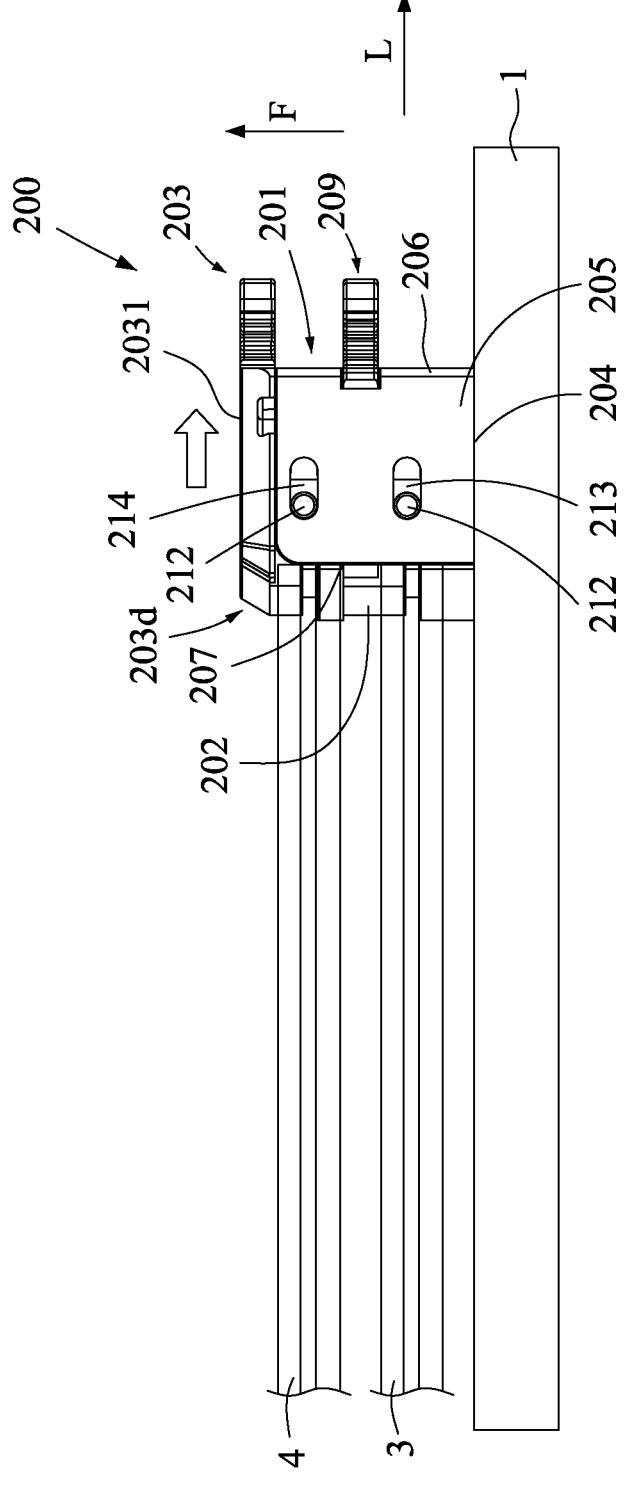
FIG. 9 is a third schematic diagram of operation of a positioning device, a first object, a second object and a third object according to a specific embodiment of the present disclosure.
Figure 10:
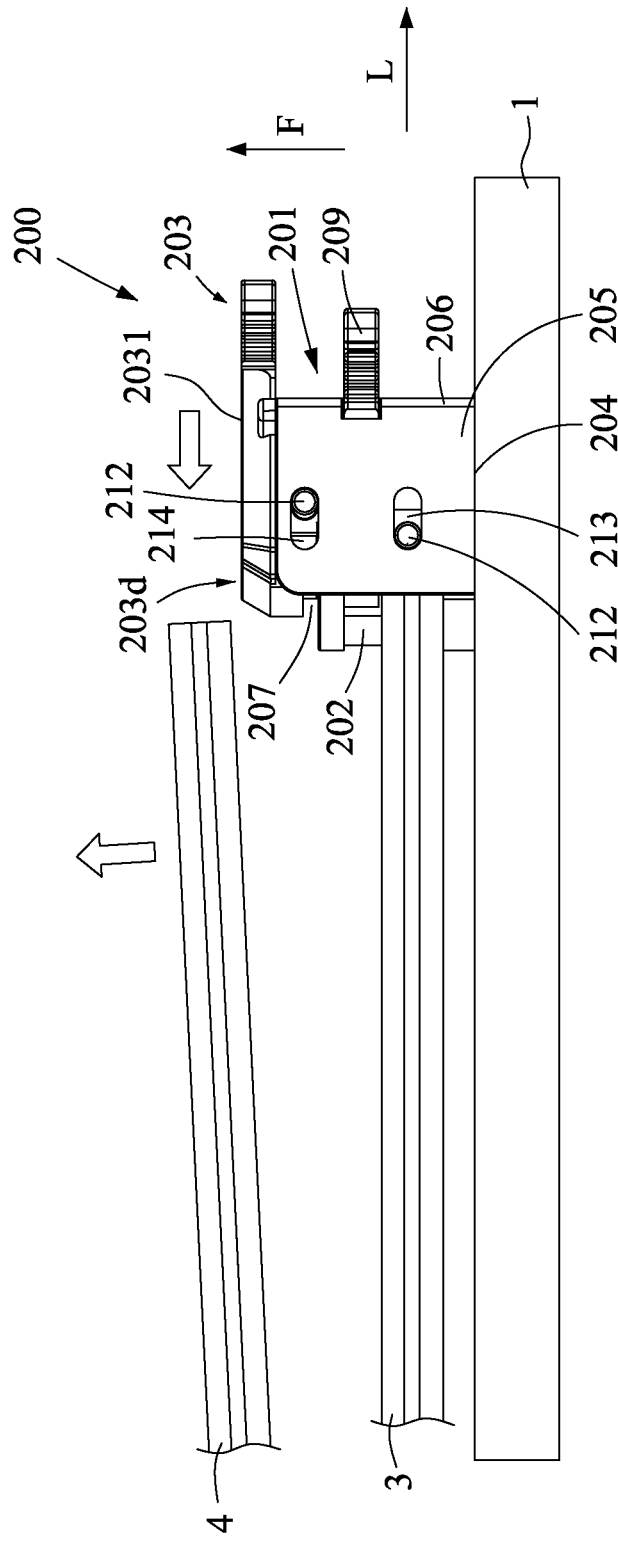
FIG. 10 is a fourth schematic diagram of operation of a positioning device, a first object, a second object and a third object according to a specific embodiment of the present disclosure.
Figure 11:
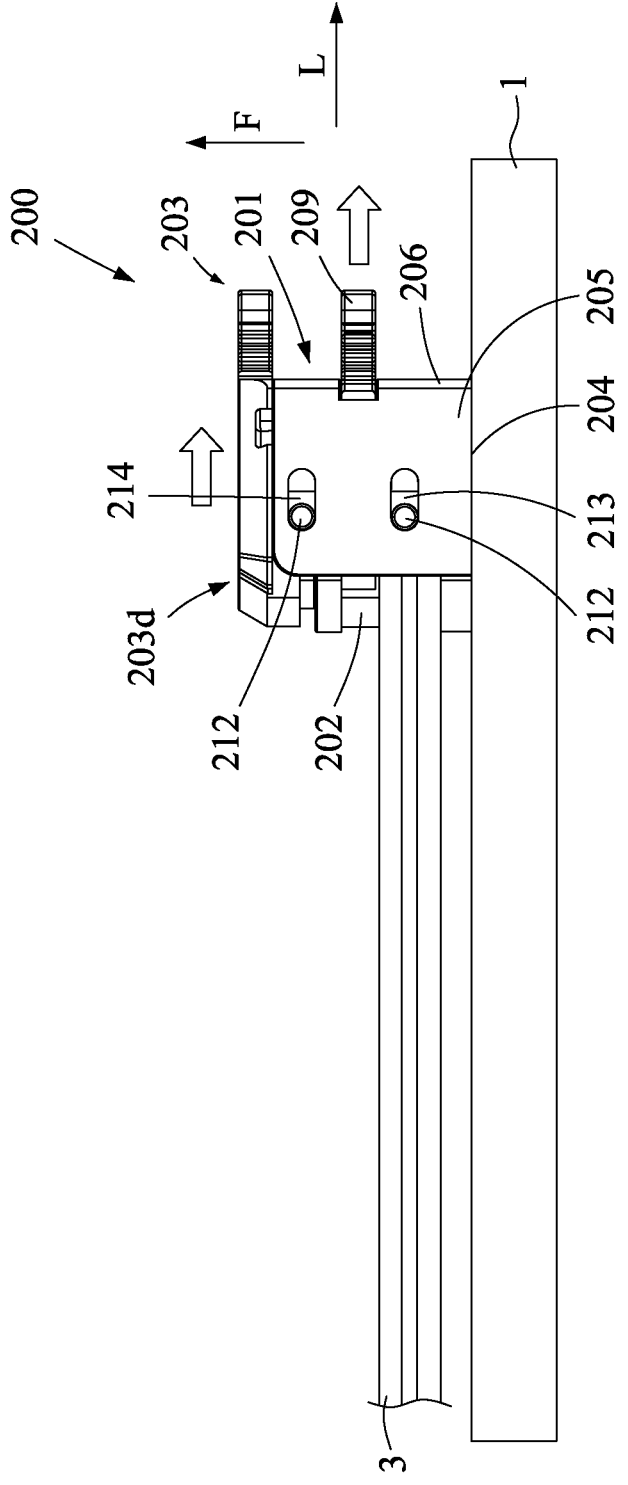
FIG. 11 is a fifth schematic diagram of operation of a positioning device, a first object and a second object according to a specific embodiment of the present disclosure.

As shown in FIG. 9 and FIG. 10, to remove the second object 3 and the third object 4 from the positioning device 200, the second positioning member 203 may be manipulated to resist elasticity and move in the lateral direction L, further removing the third object 4 from the positioning device 200.

Figure 12:
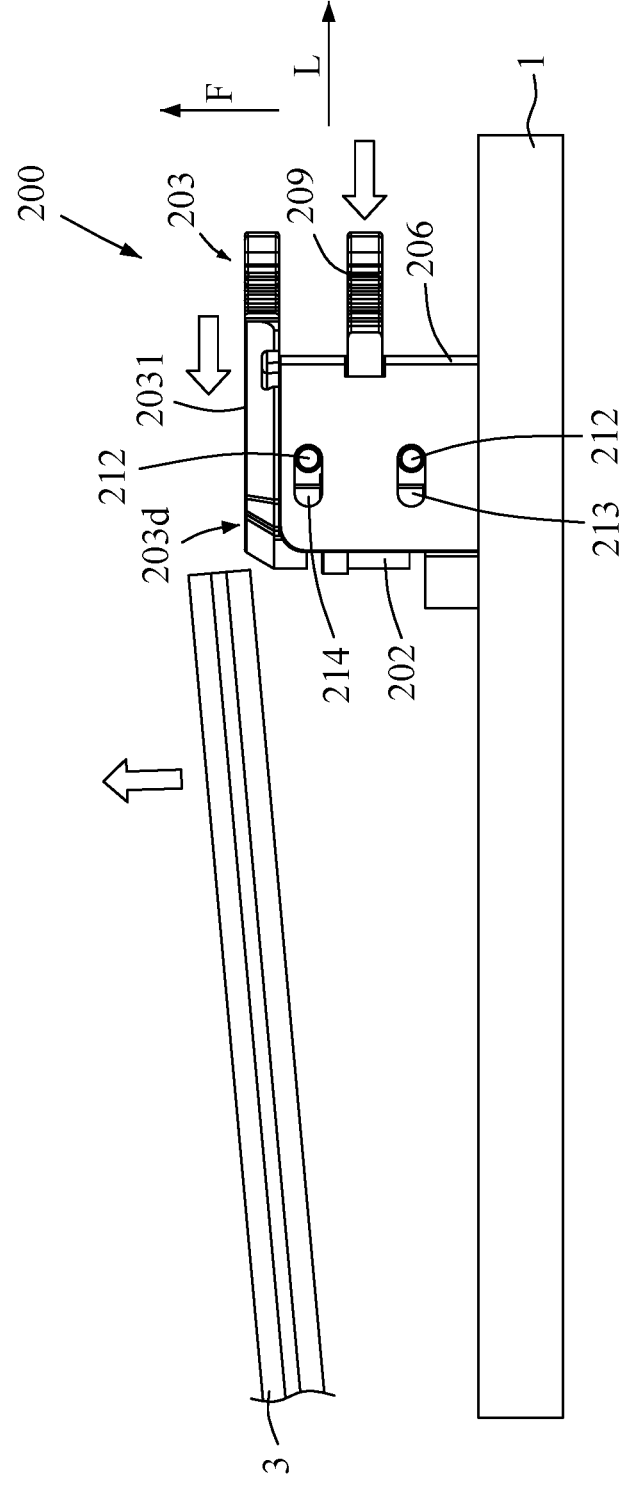
FIG. 12 is a sixth schematic diagram of operation of a positioning device, a first object and a second object according to a specific embodiment of the present disclosure.

As shown in FIG. 10 and FIG. 12, once the third object 4 is removed from the positioning device 200, the second positioning member 203 and the first positioning member 202 may be manipulated to resist elasticity and move in the lateral direction L, eventually removing the second object 3 from the positioning device 200.

As shown in FIG. 1 to FIG. 3, in one embodiment, the body 201 has a bottom wall 204, and two first sidewall 205 opposite to each other, and a second sidewall 206. The bottom wall 204 is adapted to be disposed on the surface 10 of the first object 1, the second wall 206 and the two first sidewalls 205 are connected to the bottom wall 204, the second sidewall 206 is connected between the two first sidewalls 205 and is located in the lateral direction L, and the body 201 is in the lateral direction L and has an inlet 207 opposite to the second side wall 206 for placing in the second object 3 and the third object 4. Further, the second sidewall 206 may have an operation slot 208, and the first positioning member 202 may be extended to form an operation bar 209 protruding from the operation slot 208 for a user to operate the first positioning member 202. The second positioning member 203 may also have a similar operation bar. Two opposite surfaces of the operation bar 209 may include, for example but not limited to, protruding, recessed or stepped anti-slip structures. The operation bar 209 may also have a wing-like structure, a hooked structure, a column structure, an arched structure, a sloped surface structure, a stepped structure or a planar structure. The body 201, the first positioning member 202 and the second positioning member 203 may respectively be, for example but not limited to, elements that are cured and formed from a liquid raw material injected into a mold.

As shown in FIG. 1 and FIG. 3, in one embodiment, the positioning device 200 may further include a first elastic assembly 210 and a second elastic assembly 211. The first elastic assembly 210 includes a first sleeve protrusion 210a disposed at the first positioning member 202, and a first elastic assembly 210 sleeved at the first sleeve protrusion 210a and leaning against the second sidewall 206. Similarly, the second elastic assembly 211 includes a second sleeve protrusion 211a disposed at the second positioning member 203, and a second elastic member 211 sleeved at the second sleeve protrusion 211a and leaning against the second side-wall 206. Accordingly, the first positioning member 202 and the second positioning member 203 are provided with an elastic restoring force; however, the present disclosure is not limited to the example above. A coupling member 212, for example, a screw, may be used to dispose the first sleeve protrusion 210a at the first positioning member 202 and to dispose the second sleeve protrusion 211a at the second positioning member 203; however, the present disclosure is not limited to the example above. The first elastic element 210b and the second elastic element 211b may be, for example but not limited to, springs.

As shown in FIG. 1 to FIG. 12, in one embodiment, at least one of the first sidewalls 205 may include a first chute 213 and a chute 214, the coupling member 212 of the first positioning member 202 may be a sliding block corresponding to the first chute 213, and similarly, the coupling member 212 of the second positioning member 203 may be a sliding block corresponding to the second chute 214. Thus, the first positioning member 202 and the second positioning member 203 are guided to move in the lateral direction L, and the body 201 is provided with support with respect to the first positioning member 202 and the second positioning member 203. It should be noted that the present disclosure is not limited to the examples above.

As shown in FIG. 3, in one embodiment, a bottom surface 203a of the second positioning member 203 leans against the first positioning member 202, and the second positioning member 203 has on one side facing the third object 4 a second recess 203b, and the third object 4 has on one side a third protrusion 40 corresponding to the second recess 203b. Similarly, a first bottom surface 202a of the first positioning member 202 leans against the body 201, and the first positioning member 202 has on one side facing the second object 3 a first recess 202b, and the second object 3 has on one side a protrusion 30 corresponding to the first recess 202b, the first recess 202b and the second recess 203b are aligned with each other along a direction normal to the bottom wall 204. Thus, the second object 3 and the third object 4 may be positioned by the positioning device 200.

Figure 13:
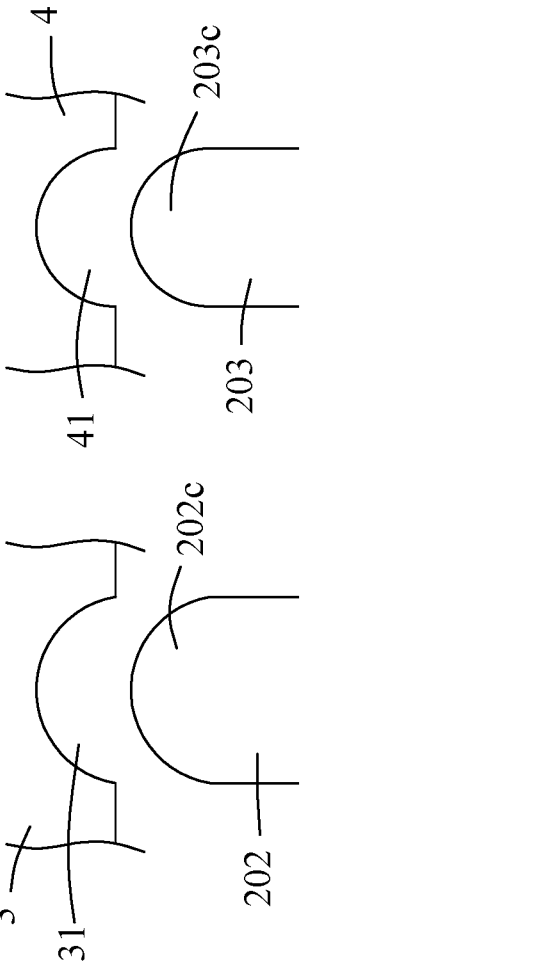
FIG. 13 is a first top view of a positioning device, a first object, a second object and a third object according to a specific embodiment of the present disclosure.

As shown in FIG. 13, in one embodiment, the first positioning member 202 has on one side a U-shaped first protrusion 202c, and the second object 3 has on one side a U-shaped recess 31. Similarly, the second positioning member 203 may also have on one side a U-shaped second protrusion 203c, and the third object 4 may have on one side a U-shaped second recess 41. Thus, a clamping area is increased to enhance positioning stability.

As shown in FIG. 1 to FIG. 12, in one embodiment, a top surface 203d of the second positioning member 203 may include an operation portion 2031, which may be, for example but not limited to, a protruding, recessed or stepped anti-slip structure. The operation portion may also have a wing-like structure, a hooked structure, a column structure, an arched structure, a sloped surface structure, a stepped structure or a planar structure.

As shown in FIG. 2 to FIG. 3, in one embodiment, the bottom wall 204 of the body 201 may have a screw hole 217 and is extended to form a positioning pin 218, the first object 1 has an opening 11 corresponding to the screw hole 217 and a positioning hole 12 corresponding to the positioning pin 218, and the body 201 is locked on the surface 10 of the first object 1 by a screw (not shown). Thus, once the body 201 is disposed on the first object 1, when the second object 3 or the third object 4 is positioned at the positioning device 200, the body 201 does not rotate or turn relative to the first object 1. It should be noted that the present disclosure is not limited to the examples above.

Figure 14:
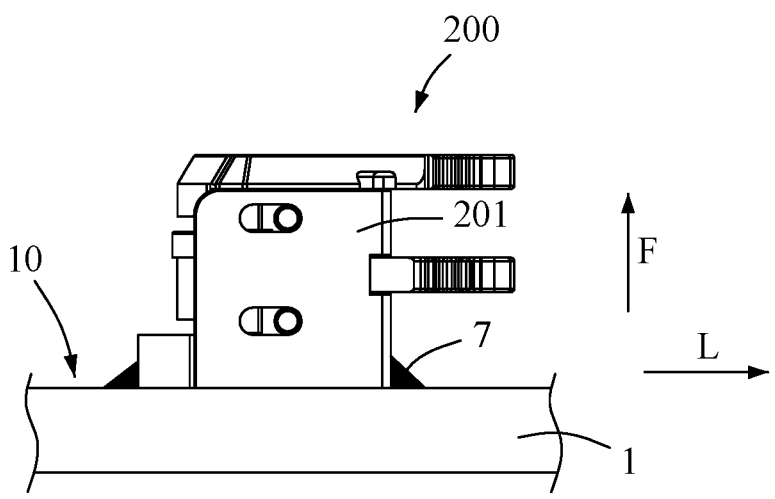
FIG. 14 is a first schematic diagram of a positioning device disposed at a first object according to a specific embodiment of the present disclosure.
Figure 23:
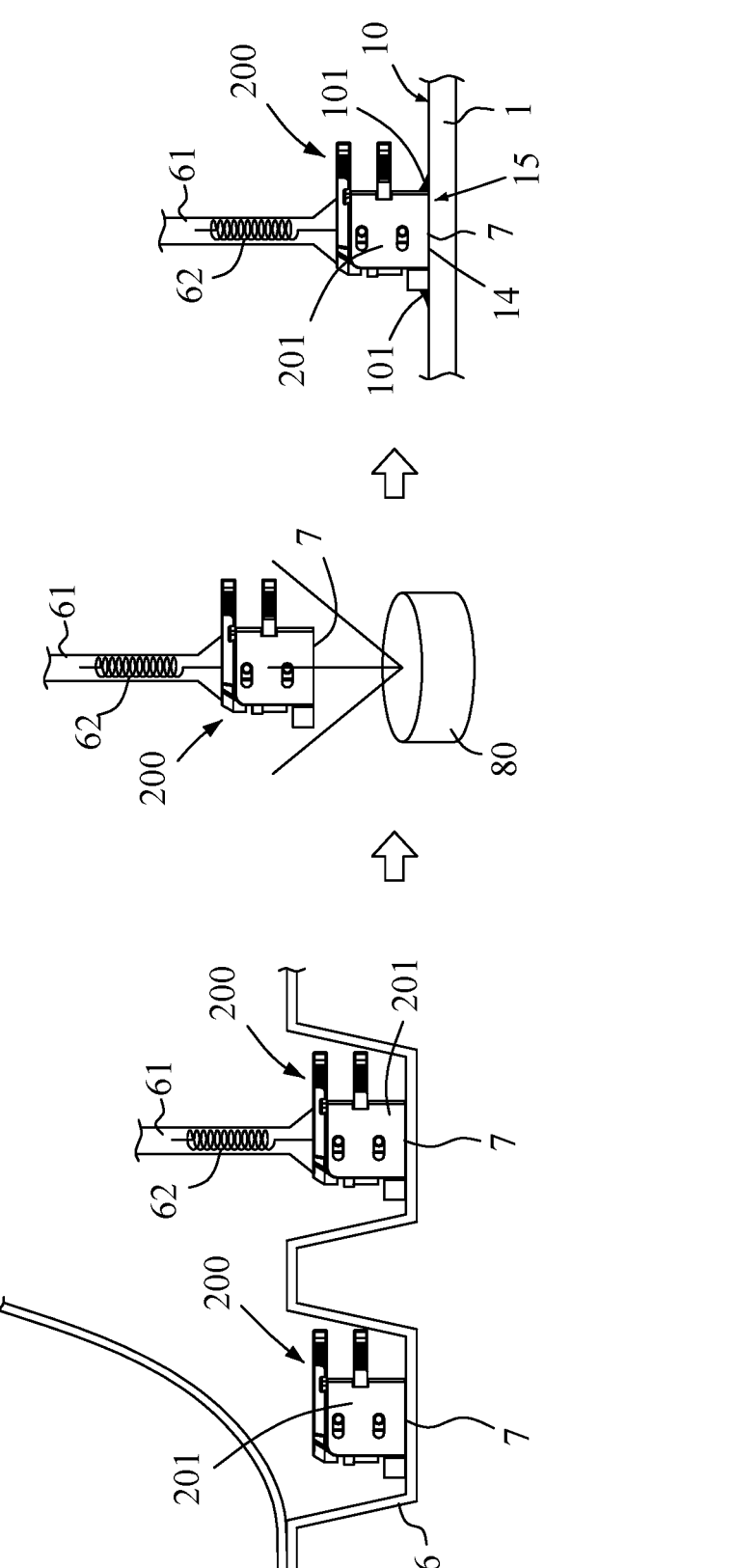
FIG. 23 is a first schematic diagram of use of a positioning device, a carrier and a first object according to a specific embodiment of the present disclosure.
Figure 24:
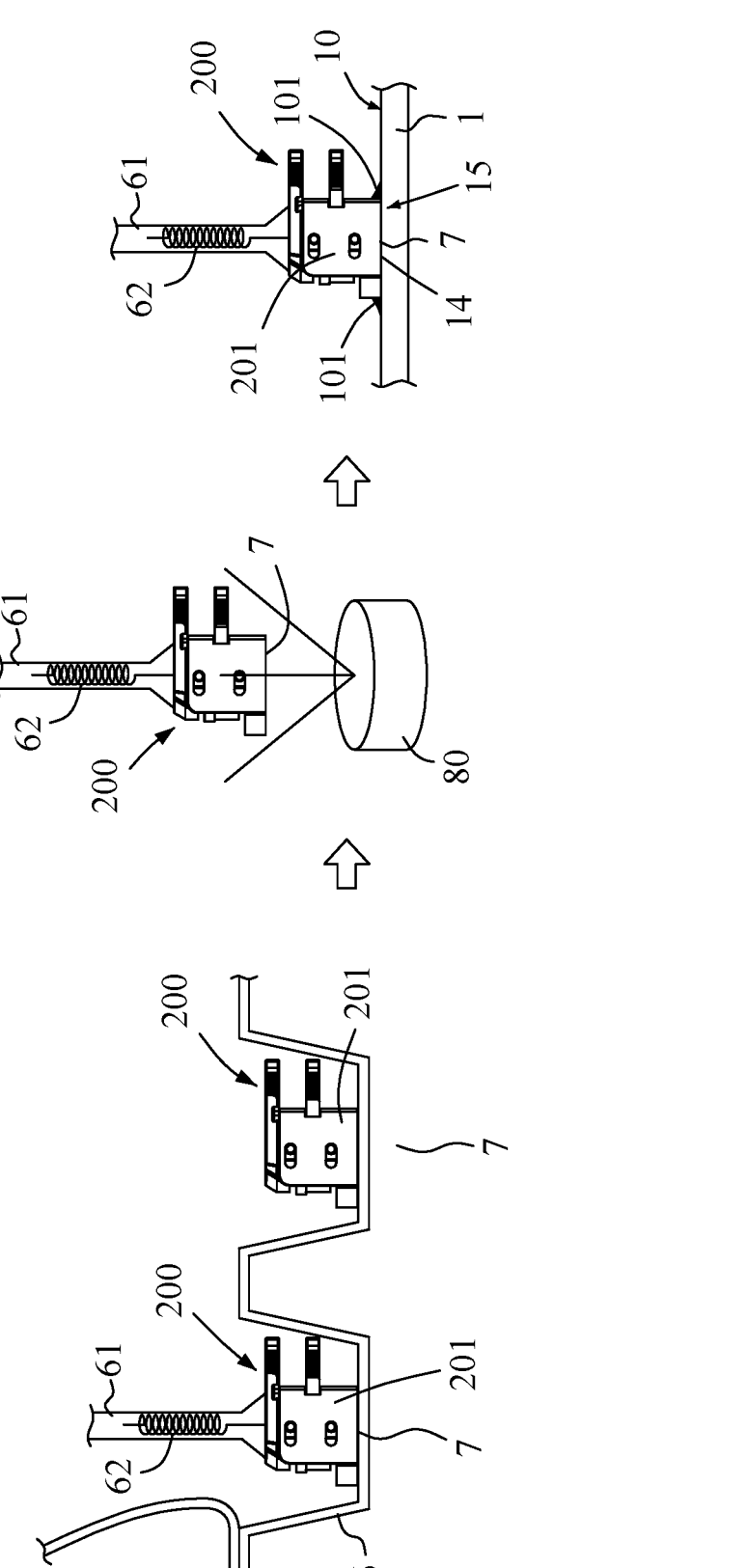
FIG. 24 is a second schematic diagram of use of a positioning device, a carrier and a first object according to a specific embodiment of the present disclosure.

As shown in FIG. 14, FIG. 23 and FIG. 24, before coupling with the first object 1, the positioning device 200 may be carried at a carrier 6. A method for assembling a positioning device at an object is further provided according to another embodiment of the present disclosure, and includes: providing the positioning device 200; providing a tool 61, and extracting the positioning device 200 located in the carrier 6 by the tool 61; moving the tool 61 having the extracted positioning device 200 to a predetermined height above an assembly position 15 of the first object 1 or directly moving the tool 61 to the assembly position 15; and releasing or loosening the positioning device 200 so that the positioning device 200 is disposed at the assembly position 15. In one embodiment, the body 201 may be welded on the first object 1. As shown in FIG. 23 and FIG. 24, the body 201 may be provided with a welding layer 7, and the assembly position 15 of the first object 1 may be provided with a corresponding welding layer 14. The positioning device 200 taken out by the tool 61 may first be compared by a comparison device 80 to determine the position of the corresponding welding layer 101 at the first object 1 or a distance between the welding layer 7 and the corresponding welding layer 101, and comparison information is then provided to the tool 61. Thus, the tool 61 may move according to the comparison information from the comparison device, so as to move the positioning device 200 extracted by the tool to the corresponding welding layer 14, allowing the body 201 to be welded and assembled via the welding layer 7 and the corresponding welding layer 14 of the first object 1. In FIG. 23, the tool 61 may elastically press the positioning device 200 downward at the first object 1 by a second elastic member 62 such as a compression spring. The tool 61 is adapted to sense feedback information of the positioning device 200 contacting the first object 1, and the tool 61 may release or loosen the positioning device 200 so that the positioning device 200 is disposed at the assembly position at which the first object 1 is provided with the corresponding welding layer 14. The tool 61 may be a vacuum suction device, a magnetic suction device or a fixture, the comparison device 80 is a visual comparison device, an image comparison device or a distance calculation device, and the first object 1 may be a PCB, a metal board or a plastic board.

Figure 15:
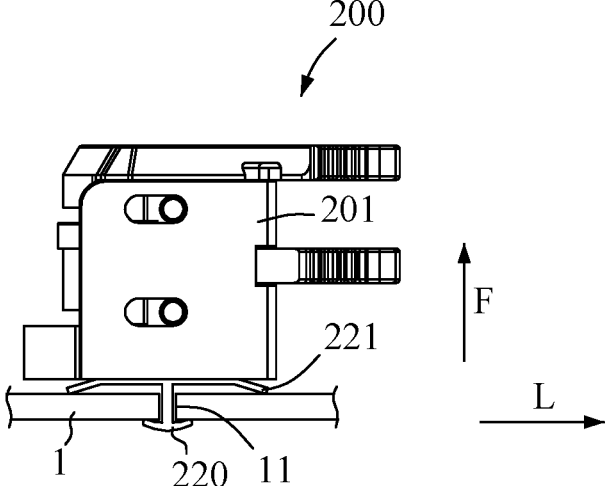
FIG. 15 is a second schematic diagram of a positioning device disposed at a first object according to a specific embodiment of the present disclosure.

As shown in FIG. 15, in one embodiment, the body 201 includes a stop button 220 and at least one elastic stop portion 221. The stop button 220 is for coupling at the opening 11 of the first object 1, and the elastic stop portion 221 is for elastically stopping the first object 1 so that the first object 1 is elastically engaged between the stop button 220 and the elastic stop portion 221. The stop button 220 and the elastic stop portion 221 have a same stop direction, and are for engaging at the first object 1 in a perpendicular manner.

Figure 16:
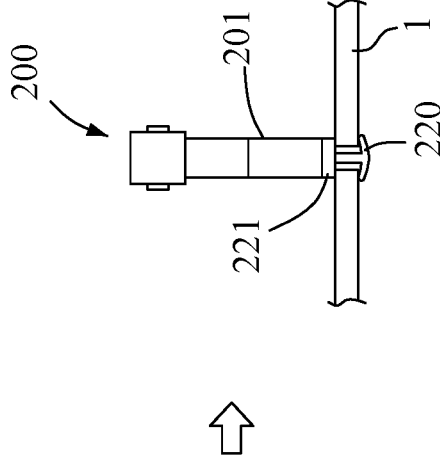
FIG. 16 is a third schematic diagram of a positioning device disposed at a first object according to a specific embodiment of the present disclosure.
Figure 16:
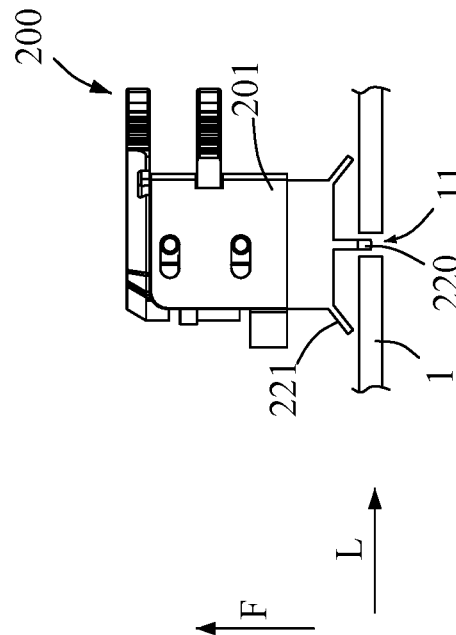

As shown in FIG. 16, in one embodiment, the stop button 220 and the elastic stop portion 221 have different stop directions (similarly arranged at the body 201 at 180 degrees). To assemble the body 201, the stop button 220 first passes through the opening 11 of the first object 1, the body 201 is rotated by an angle of 5 degrees to 355 degrees and is used to interfere, fittingly connect with or stop the first object 10, so that the first object 10 is elastically engaged between the stop button 220 and the elastic stop portion 221.

Figure 17:
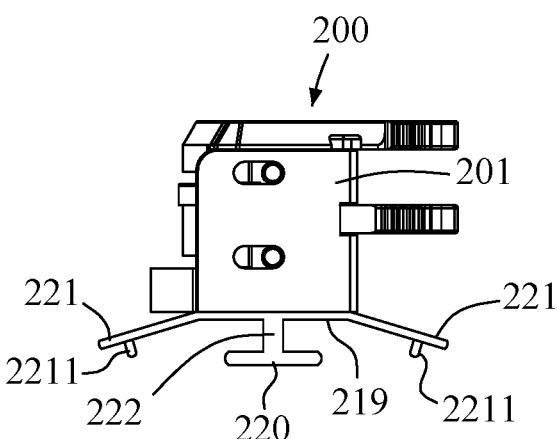
FIG. 17 is a first schematic diagram of a process of disposing a positioning device at a first object according to a specific embodiment of the present disclosure.
Figure 18:
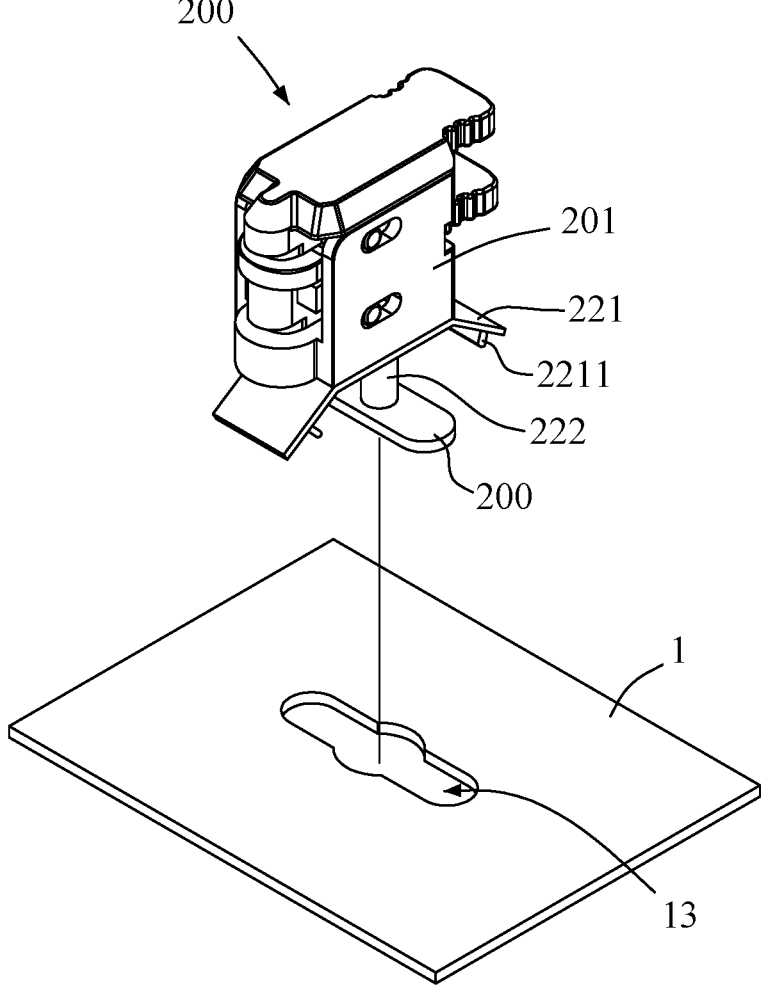
FIG. 18 is a second schematic diagram of a process of disposing a positioning device at a first object according to a specific embodiment of the present disclosure.
Figure 19:
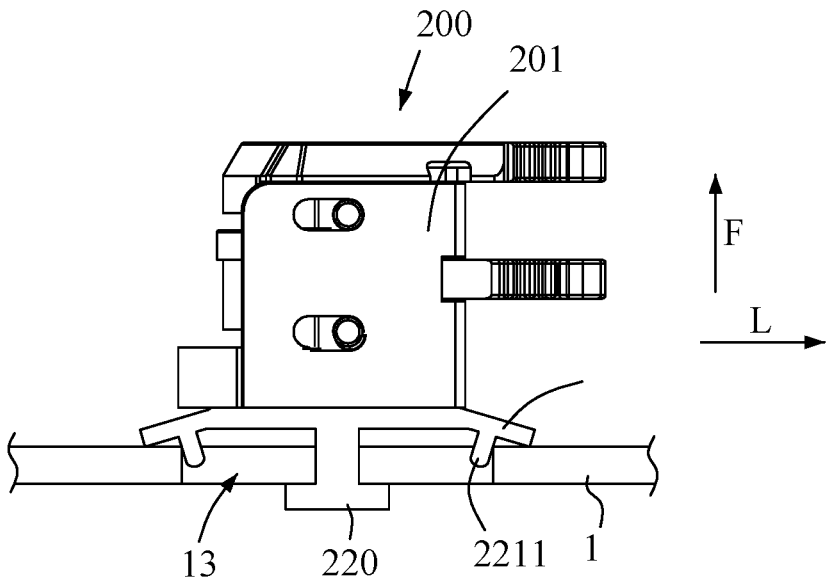
FIG. 19 is a third schematic diagram of a process of disposing a positioning device at a first object according to a specific embodiment of the present disclosure.

As shown in FIG. 17 to FIG. 19, in one embodiment, the body 201 includes a shaft 222, a stop button 220 and two elastic stop portion 221. The shaft 222 is located at a bottom surface 219 of the body 201, the stop button 220 is connected to the shaft 222, and the elastic stop portions 221 are located on two sides below the body 201. A bottom surface of each of the elastic stop portions 221 is provided with a fastening protrusion 2211. The stop button 220 and the elastic stop portions 221 may have different stop directions (the stop button 220 is disposed at the body 201 at 90 degrees, and the elastic stop portions 221 are disposed at the body 201 at 180 degrees). The first object 1 has a wide slot 13, and a wide part of the shaft 222 is smaller than a wide side of the stop button 220 and smaller than the wide slot 13 of the first object 1. To assemble the body 201, the stop button 220 first passes through the wide slot 13 of the first object 1, so that the wide side of the stop button 220 passes the first object 1 (at this point the shaft 222 is located in the wide slot 13) via the wide side of the wide slot 13. Then, the body 201 is rotated so that the wide side of the stop button 220 is rotated to a position at a non-wide side of the wide slot 13 to perform stopping. Meanwhile, the elastic stop portion 221 is rotated from the non-wide side or the wide side of the wide slot 13 to the wide side or the non-wide side of the wide slot 13 so as to stop at the bottom surface of the first object 1. Moreover, the fastening protrusions 2211 are rotated from the non-wide side or the wide side of the wide slot 13 to stop at inside or outside the wide slot 13 so as to limit the position of the elastic stop portion 221, and are further placed into the wide slot 13 of the first object 1 for fitting connection, thereby engaging the first object 1 between the stop button 220 and the elastic stop portion 221.

Figure 20:
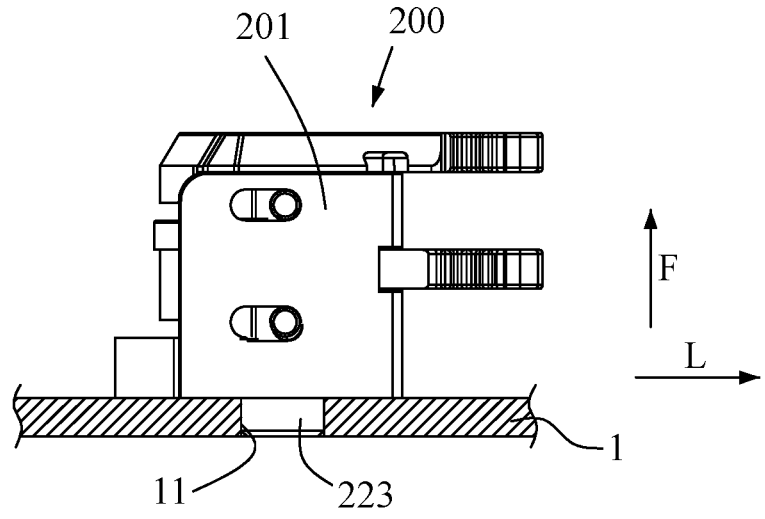
FIG. 20 is a fourth schematic diagram of a positioning device disposed at a first object according to a specific embodiment of the present disclosure.
Figure 21:
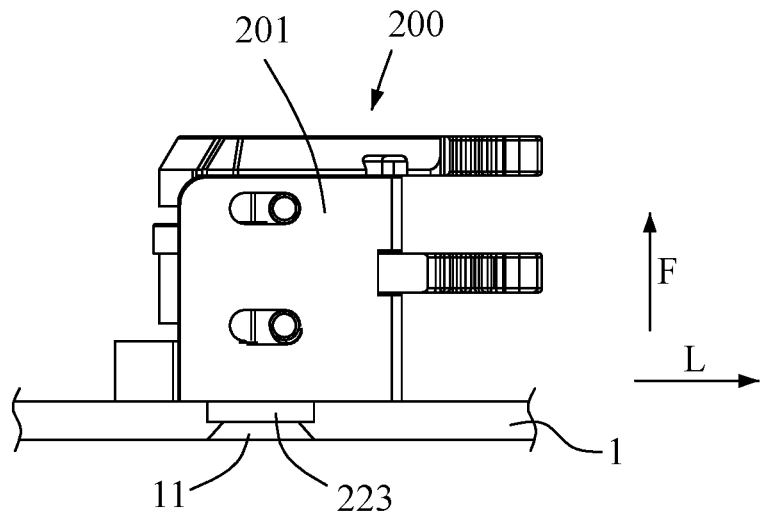
FIG. 21 is a fifth schematic diagram of a positioning device disposed at a first object according to a specific embodiment of the present disclosure.
Figure 22:
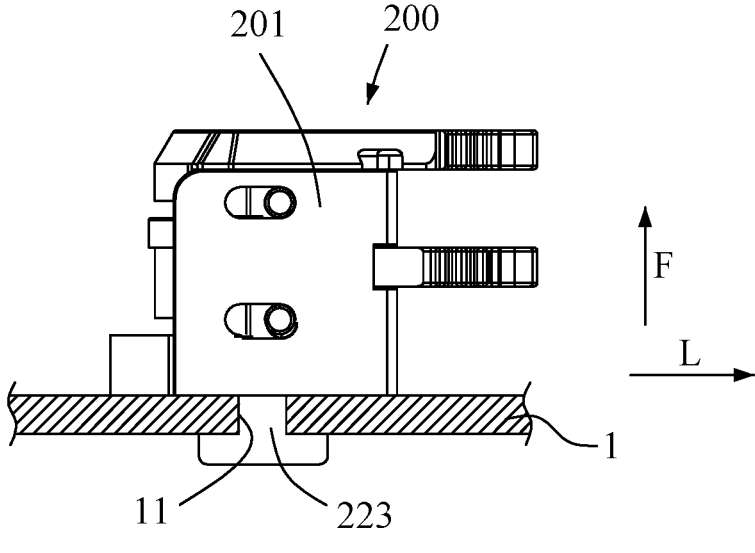
FIG. 22 is a sixth schematic diagram of a positioning device disposed at a first object according to a specific embodiment of the present disclosure.

As shown in FIG. 20 to FIG. 22, in addition to the screw connection structure in FIG. 3 and the welding structure in FIG. 14, the body 201 may also have an assembly portion 223. The assembly portion 223 couples with the first object 1 along the normal direction F, and the assembly portion 223 may be a column connection structure (as shown in FIG. 20), a rivet connection structure (as shown in FIG. 21), an engaging structure (as shown in FIG. 22), an adhesion structure, a magnetic structure or an integral structure. Preferably, the structure above may coordinate with the positioning structure of the positioning pin 218 and the positioning hole 12 in FIG. 3, such that the body 201 of the positioning device 200 of the present disclosure cannot be turned or rotated relative to the first object 1 and is hence assembled with the first object 1 into a module.

Figure 25:
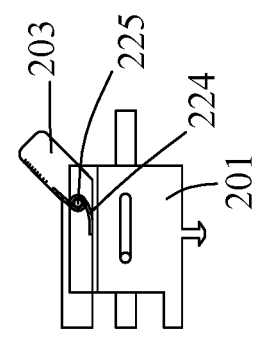
FIG. 25 is a schematic diagram of use of a positioning device and a first object according to a specific embodiment of the present disclosure.
Figure 25:
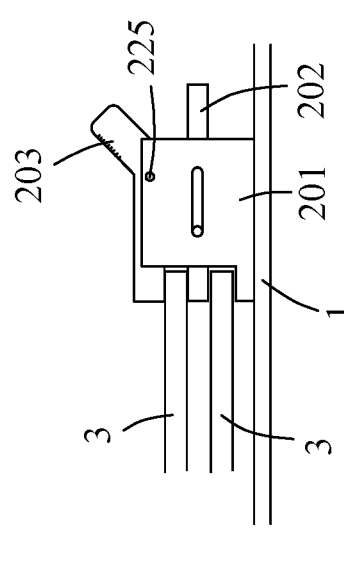
Figure 25:
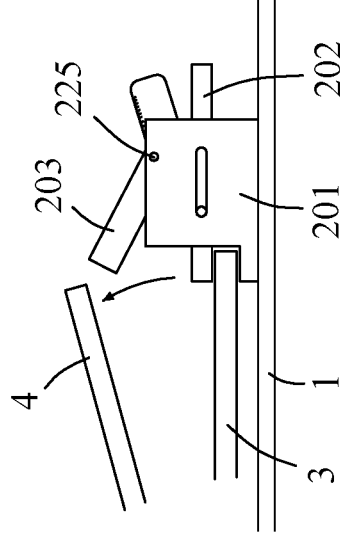

As shown in FIG. 25, in one embodiment, the second positioning member 203 or the first positioning member 202 may also be pivotally connected or assembled at the body 201, so as to be pushed by the second object 3 and the third object 4 or manually operated to move in reverse relative to the body 201. The positioning device 200 may further include a first elastic member 224. For example, the first elastic member 224 is a torsion spring. For example but not limited to, the center of the first elastic member 224 may be coupled to a pivotal shaft 225 of the second positioning member 203 that is pivotally connected to the body 201. Two ends of the first elastic member 224 may also respectively press against the body 201 and the second positioning member 203 or the first positioning member 202, so that the second positioning member 203 or the first positioning member 202 can reciprocally and rotationally move relative to the body 201.

Referring to FIG. 26 to FIG. 35, a positioning device 200 provided according to another embodiment of the present disclosure includes a body 201, a first positioning member 202 and a second positioning member 203. The body 201 is adapted to be disposed on a first object 1. The first positioning member 202 is movably connected to the body 201 or the second positioning member 203, and includes an actuating portion 2020. The second positioning member 203 is movably connected to the body 201, the first positioning member 202 is located between the second positioning member 203 and the first object 1, the second positioning member 203 includes an actuated portion 2030 corresponding to the actuating portion 2020, a movement space S is present between the actuating portion 2020 and the actuated portion 2030, and the actuating portion 2020 and the actuated portion 2030 are capable of relative movement in a direction of the movement space S. Specifically, the first positioning member 202 may be assembled, movably assembled, engaged or movably engaged at the second positioning member 203, or one of the first positioning member 202 and the second positioning member 203 is assembled, movably assembled, engaged or movably engaged with the body 201.

In one embodiment, the first positioning member 202 is adapted to drive the actuated portion 2030 by the actuating portion 2020 to collaterally move the second positioning member 203, so that a second object 3 is arranged on the body 201. The second positioning member 203 is adapted to be separately moved in the movement space S between the actuating portion 2020 and the actuated portion 2030, so that a third object 4 is arranged on the first positioning member 202.

In one embodiment, the first positioning member 202 is movably connected to the body 201 so as to be adapted to be disposed together with the body 201 on the first object 1.

In one embodiment, the first positioning member 202 is adapted to drive the actuated portion 2030 by the actuating portion 2020 to collaterally move the second positioning member 203, and the second positioning member 203 is adapted to be separately moved in the movement space S between the actuating portion 2020 and the actuated portion 2030.

In one embodiment, the first positioning member 202 is adapted to drive the actuated portion 2030 by the actuating portion 2020 to collaterally move the second positioning member 203. It should be noted that, the second positioning member 203 is also adapted to drive the actuating portion 2020 by the actuated portion 2030 to collaterally move the first positioning member 202.

Figure 29:
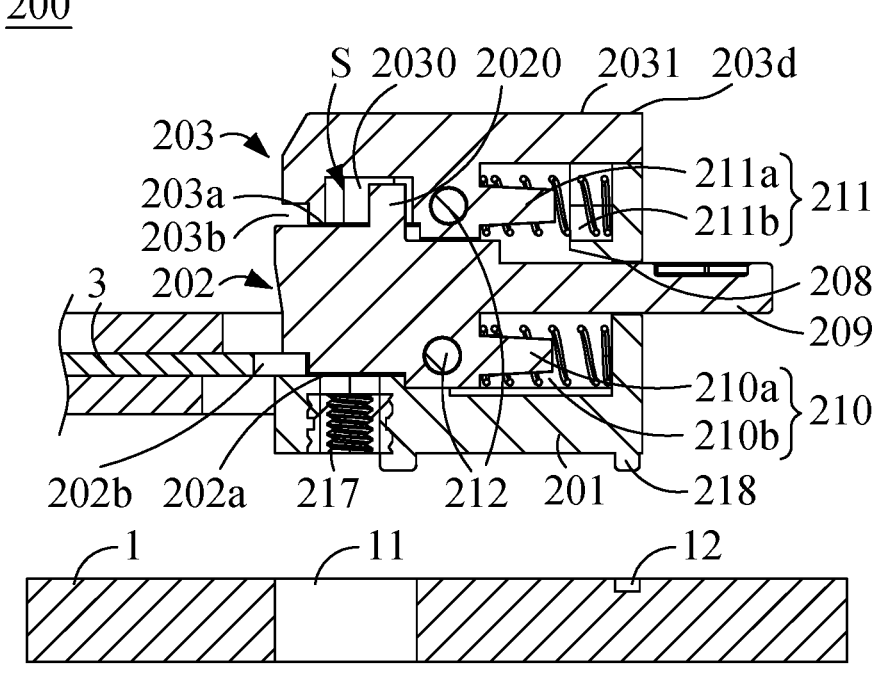
FIG. 29 is a fourth schematic diagram of operation of a positioning device, a first object and a second object according to a specific embodiment of the present disclosure.
Figure 30:
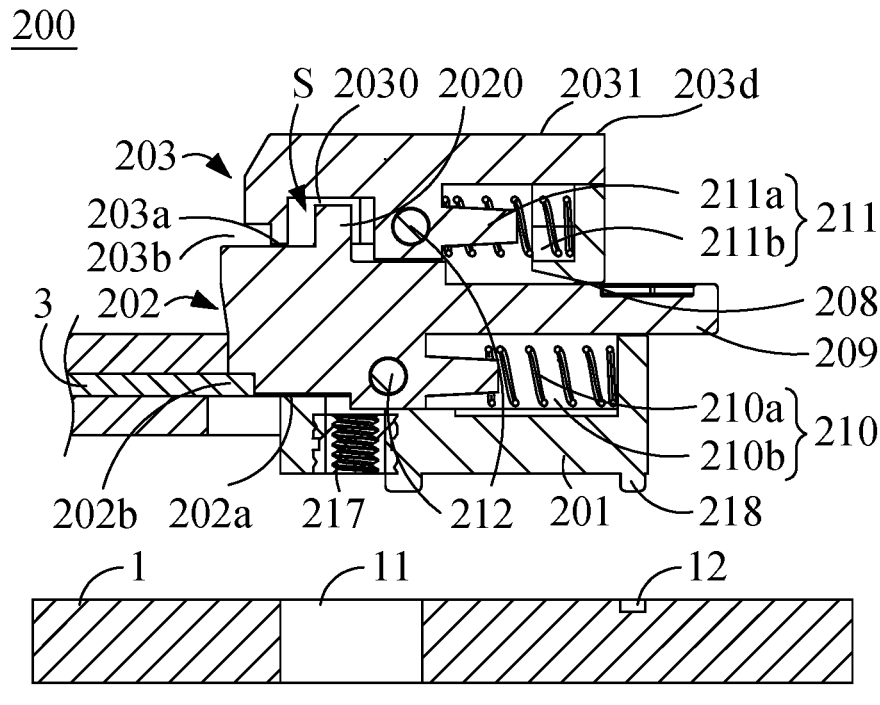
FIG. 30 is a fifth schematic diagram of operation of a positioning device, a first object and a second object according to a specific embodiment of the present disclosure.
Figure 31:
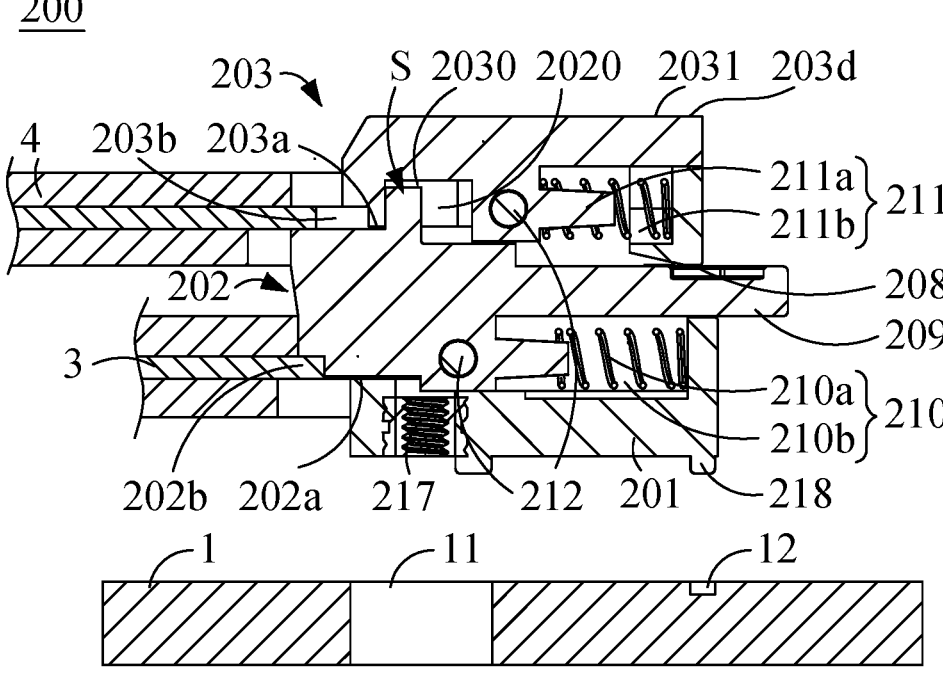
FIG. 31 is a sixth schematic diagram of operation of a positioning device, a first object and a second object according to a specific embodiment of the present disclosure.
Figures 32, 33:
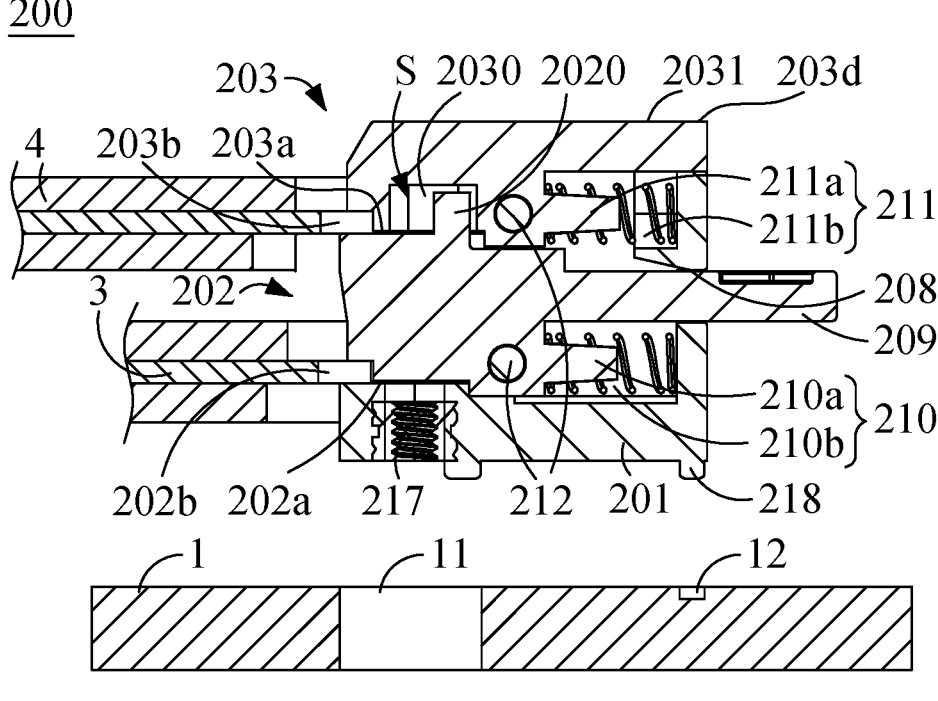
FIG. 32 is a seventh schematic diagram of operation of a positioning device, a first object, a second object and a third object according to a specific embodiment of the present disclosure.
FIG. 33 is a first perspective schematic diagram of a positioning device from directions of two sides according to a specific embodiment of the present disclosure.

Referring to FIG. 29 to FIG. 32, a method of use of a positioning device is further provided according to another embodiment of the present disclosure, and includes: as shown in FIG. 29 and FIG. 30, disposing the body 201 on the first object 1; moving the first positioning member 202 and driving the second positioning member 203 so as to arrange the second object 3 on the body 201; and as shown in FIG. 31 and FIG. 32, separately moving the second positioning member 203 so as arrange the third object 4 on the first positioning member 202. To remove the third object 4, the second positioning member 203 is separately moved. To remove the second object 3, the first positioning member 202 is moved to drive the second positioning member 203.

Thus, the positioning device 200 and the method of use thereof of the present disclosure are capable of quickly and simply assembling and removing the second object 3 and the third object 4 laterally on or from the first object 1.

Figure 26:
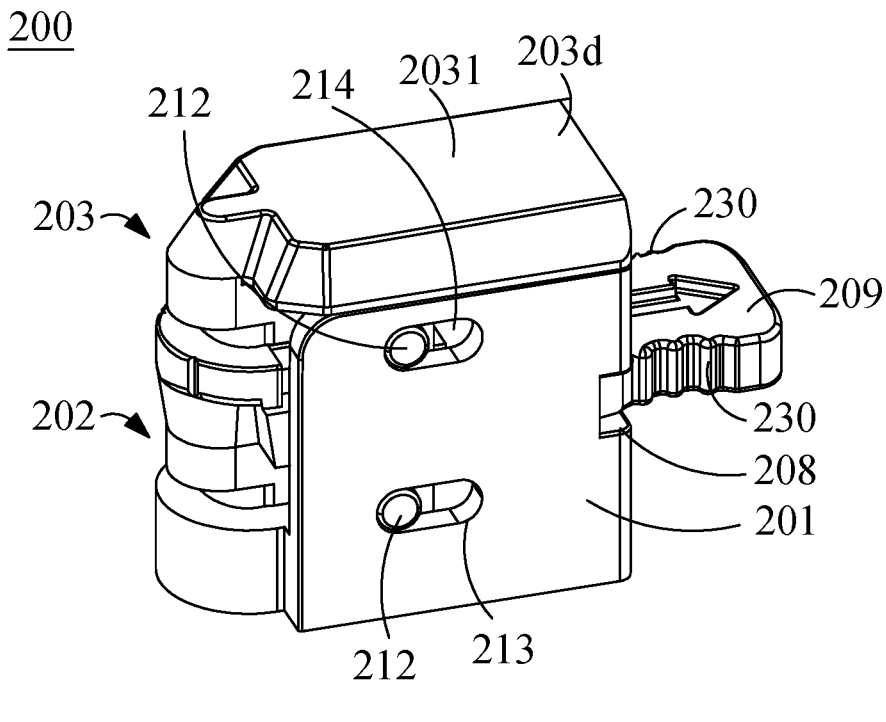
FIG. 26 is a third three-dimensional schematic diagram of a positioning device according to a specific embodiment of the present disclosure.
Figure 27:
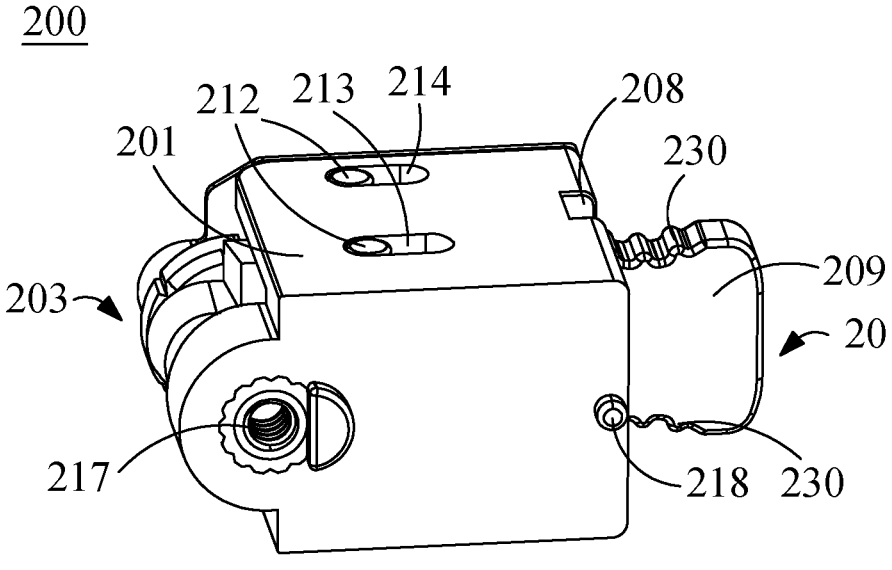
FIG. 27 is a fourth three-dimensional schematic diagram of a positioning device according to a specific embodiment of the present disclosure.
Figure 28:
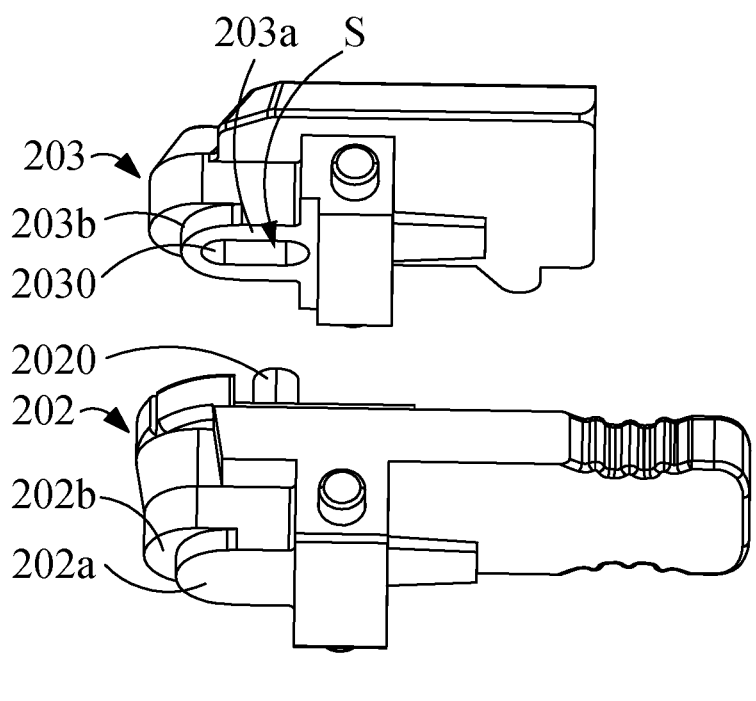
FIG. 28 is an exploded three-dimensional schematic diagram of a first positioning member and a second positioning member according to a specific embodiment of the present disclosure.

Referring to FIG. 26 to FIG. 28, similar to the embodiments in FIG. 1 to FIG. 25, the first object 1, the second object 3 and the third object 4 are, for example but not limited to, circuit boards, metal boards or plastic boards. The second object 3 and the third object 4 may be spaced by a gap once having been positioned at the lateral positioning device 200. Two or all of the first object 1, the second object 3 and the third object 4 may be electrically connected to each other. The second object 3 or the third object 4 may be a circuit board, a plastic board, a memory card, an M.2 card, an integrated circuit card, a wafer module or a hard drive.

Figure 34:
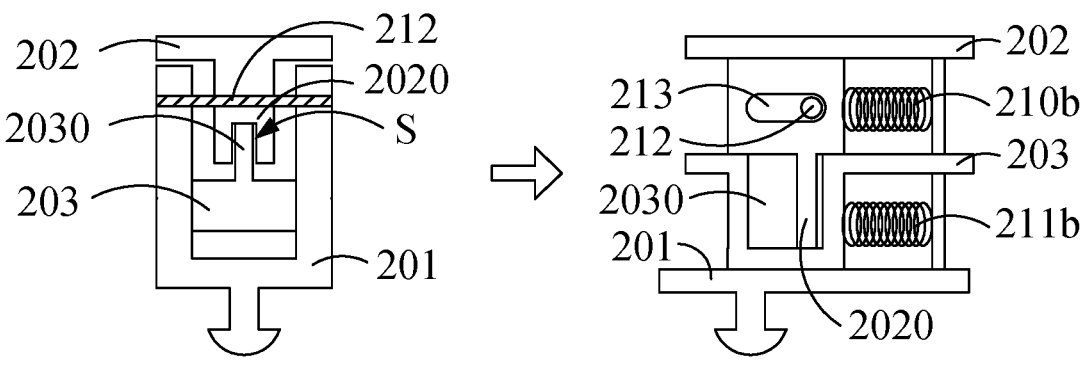
FIG. 34 is a second perspective schematic diagram of a positioning device from directions of two sides according to a specific embodiment of the present disclosure.
Figure 35:
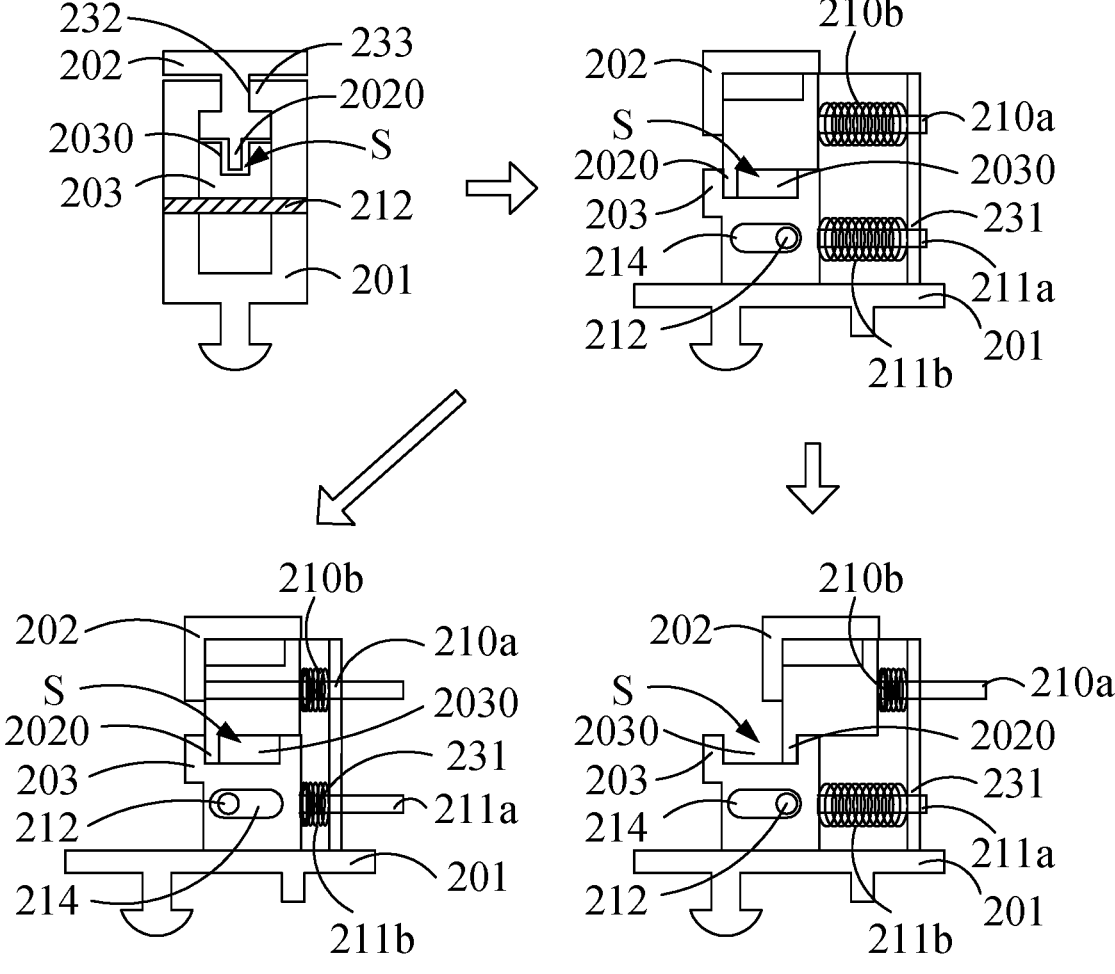
FIG. 35 is a schematic diagram of two operations of a positioning device according to a specific embodiment of the present disclosure.

As shown in FIG. 28, FIG. 33 and FIG. 35, the actuating portion 2020 is a protrusion, and the actuated portion 2030 is a recess and is provided with the movement space S; however, the present disclosure is not limited to the example above. As shown in FIG. 34, the actuating portion 2020 may also be a recess and is provided with the movement space S, and the actuated portion 2030 at this point is a protrusion.

As shown in FIG. 29 to FIG. 35, similar to the embodiment in FIG. 1, each of the first positioning member 202 and the second positioning member 203 may connected to the body 201 by an elastic member. When the first positioning member 202 drives the second positioning member 203 to move, the elastic force of the respective elastic members of the first positioning member 202 and the second positioning member 203 is resisted. Once the second object 3 is arranged on the body 201, the first positioning member 202 and the second positioning member 203 are simultaneously elastically restored by the corresponding elastic members, so as to clamp the second object 3 between the body 201 and the first positioning member 202. Once the third object 4 is arranged on the first positioning member 202, the second positioning member 203 is elastically restored by the corresponding elastic member, so as to clamp the third object 4 between the first positioning member 202 and the second positioning member 203. Specifically, the positioning device 200 may further include a first elastic assembly 210 and a second elastic assembly 211. The first elastic assembly 210 includes a first sleeve protrusion 210a disposed at the first positioning member 202, and a first elastic element 210b sleeved at the first sleeve protrusion 210a and leaning against the body 201. Similarly, the second elastic assembly 211 includes a second sleeve protrusion 211a disposed at the second positioning member 203, and a second elastic member 211b sleeved at the second sleeve protrusion 211a and leaning against the body 201. Accordingly, the first positioning member 202 and the second positioning member 203 are provided with an elastic restoring force; however, the present disclosure is not limited to the example above. A coupling member 212, for example, a screw, may be used to dispose the first sleeve protrusion 210a at the first positioning member 202 and to dispose the second sleeve protrusion 211a at the second positioning member 203; however, the present disclosure is not limited to the example above. The first elastic element 210b and the second elastic element 211b may be, for example but not limited to, springs. Once the second object 3 and the third object 4 are positioned at the positioning device 200, the second positioning member 203 is adapted to resist the elasticity and thus moves, so that the third object 4 can be removed from the positioning device 200. Once the third object 4 is removed from the positioning device 200, the second positioning member 203 and the first positioning member 202 are adapted to resist the elasticity and thus move simultaneously, so that the second object 3 can be removed from the positioning device 200.

As shown in FIG. 26, the body 201 may have an operation slot 208, and the first positioning member 202 may be extended to form an operation bar 209 protruding from the operation slot 208 for a user to operate the first positioning member 202. The second positioning member 203 may also have a similar operation bar. Two opposite surfaces of the operation bar 209 may include, for example but not limited to, protruding, recessed or stepped anti-slip structures. The operation bar 209 may also have a wing-like structure, a hooked structure, a column structure, an arched structure, a sloped surface structure, a stepped structure or a planar structure. The body 201, the first positioning member 202 and the second positioning member 203 may respectively be, for example but not limited to, elements that are cured and formed from a liquid raw material injected into a mold.

As shown in FIG. 26, FIG. 27 and FIG. 29 to FIG. 35 similar to the embodiment in FIG. 1, the body 201 may include a first chute 213 and a chute 214, the coupling member 212 of the first positioning member 202 may be a sliding block corresponding to the first chute 213, and similarly, the coupling member 212 of the second positioning member 203 may be a sliding block corresponding to the second chute 214. Thus, the first positioning member 202 and the second positioning member 203 are guided to move in the lateral direction L, and the body is provided with support with respect to the first positioning member 202 and the second positioning member 203. It should be noted that the present disclosure is not limited to the examples above. For example, the body 201 may also be provided with only the first chute 213 or the second chute 214 so as to assemble the first positioning member 202 and the second positioning member 203. Moreover, the first chute 213 or the second chute 214 may also be respectively arranged at the first positioning member 202 and the second positioning member 203. Moreover, only one between the first positioning member 202 and the second positioning member 203 is slidably connected to the body 201. For example, in FIG. 34, only the first positioning member 202 is slidably connected to the body 201 by the first chute 213 and the coupling member 212, and the second positioning member 203 is limited in the body 201. Alternatively, for example, in FIG. 35, only the second positioning member 203 is slidably connected to the body 201 by the second chute 214 and the coupling member 212, and the first positioning member 202 is limited in the body 201.

As shown in FIG. 35, the body 201 may include a corresponding sleeve 231 for correspondingly guiding or sleeving the first sleeve protrusion 210a, or the body 201 may include another corresponding sleeve 231 for correspondingly guiding or sleeving the second sleeve protrusion 211a. The corresponding sleeves 231 may be through holes, so that the first sleeve protrusion 210a or the second sleeve protrusion 211a can pass through and exit the body 201. The first positioning member 202 includes a limiting portion 232 that is, for example, a recess, and the limiting portion 232 is for limiting or horizontally limiting a corresponding limiting portion (for example, a protrusion) of the body 201. It is conceivable that, the second positioning member 203 may also include the limiting portion 232, so as to limit or horizontally limit a corresponding limiting portion of the body 201 by the limiting portion 232. When only the first positioning member 202 is pulled, the first positioning member 202 can move separately within a certain range; when the second positioning member 203 is pulled, the first positioning member 202 and the second positioning member 203 move together.

The present disclosure is described by way of the preferred embodiments above. A person skilled in the art should understand that, these embodiments are merely for describing the present disclosure are not to be construed as limitations to the scope of the present disclosure. It should be noted that all equivalent changes, replacements and substitutions made to the embodiments are to be encompassed within the scope of the present disclosure. Therefore, the scope of protection of the present disclosure should be accorded with the broadest interpretation of the appended claims.

What is claimed is:

1. A positioning device, comprising:
a body adapted to be disposed on a first object;
a first positioning member independently mounted on the body and laterally movable with respect to the body; and
a second positioning member independently mounted on the body and laterally movable with respect to the body,
wherein the first positioning member is located between the second positioning member and a bottom wall of the body, and the first positioning member and the second positioning member are independently movable relative to each other on the body,
wherein a second object is adapted to cross the second positioning member and the first positioning member so as to arrange the second object on the body, and a third object is adapted to cross the second positioning member and be arranged on the first positioning member,
when one end of the second object is positioned into a first recess of the first positioning member and one end of the third object is positioned into a second recess of the second positioning member, the first recess and the second recess are aligned with each other along a direction normal to the bottom wall.

2. The positioning device according to claim 1, wherein the first positioning member includes an actuating portion or an actuated portion, or the second positioning member includes an actuated portion or an actuating portion corresponding to the actuating portion or the actuated portion of the first positioning member, or a movement space is present between the actuated portion of the first positioning member and the actuating portion of the second positioning member, or the actuating portion of the second positioning member or the actuated portion of the first positioning member is for moving in a direction of the movement space.

3. The positioning device according to claim 2, adapted to be collaterally moved by driving the actuated portion by the actuating portion, so that the second positioning member or the first positioning member is separately moved via the movement space between the actuating portion and the actuated portion.

4. The positioning device according to claim 3, wherein the actuating portion drives the actuated portion to collaterally move the second positioning member or the first positioning member, and the second positioning member or the first positioning member is separately moved via the movement space between the actuating portion and the actuated portion.

5. The positioning device according to claim 3, wherein the actuating portion drives the actuated portion to collaterally move the second positioning member or the first positioning member; alternatively, the second positioning member or the first positioning member is adapted to collaterally move the first positioning member or the second positioning member by driving the actuated portion by the actuating portion.

6. The positioning device according to claim 1, wherein when the second object is arranged on the first positioning member, the second positioning member is elastically restored by an elastic element; alternatively, when the second object is arranged on the body, the first positioning member is elastically restored by an elastic element, so as to clamp the second object between the body and the first positioning member; and wherein when the third object is arranged on the first positioning member, the second positioning member is elastically restored by an elastic element, so as to clamp the third object between the first positioning member and the second positioning member.

7. The positioning device according to claim 1, wherein when the second object and the third object are positioned at the positioning device, the second positioning member is adapted to resist elasticity and thus moves, so that the third object can be removed from the positioning device; and wherein when the third object is removed from the positioning device, the second positioning member and the first positioning member are adapted to resist elasticity and thus move, so that the second object can be removed from the positioning device.

8. The positioning device according to claim 1, wherein the body comprises the bottom wall, two first sidewalls opposite to each other and a second sidewall; the bottom wall is adapted to be disposed on a surface of the first object; the second sidewall and the two first sidewalls are connected to the bottom wall; the second sidewall is connected between the two first sidewalls; and the body comprises an inlet opposite to the second sidewall and for placing the second object or the third object.

9. The positioning device according to claim 1, further comprising a first elastic assembly and a second elastic assembly, wherein the first elastic assembly comprises a first sleeve protrusion arranged at the first positioning member, and the second elastic assembly comprises a second sleeve protrusion arranged at the second positioning member.

10. The positioning device according to claim 1, wherein the first positioning member comprises a first sleeve protrusion, the second positioning member comprises a second sleeve protrusion, the body comprises a corresponding sleeve for correspondingly guiding or sleeving the first sleeve protrusion, or the body comprises another corresponding sleeve for correspondingly guiding or sleeving the second sleeve protrusion.

11. The positioning device according to claim 1, wherein the first positioning member comprises a limiting portion, and the limiting portion is for limiting or horizontally limiting a corresponding limiting portion of the body; alternatively, the second positioning member comprises the limiting portion so as to limit or horizontally limit the corresponding limiting portion of the body by the limiting portion.

12. The positioning device according to claim 1, wherein the body comprises a first chute and a second chute, the first positioning member, the second positioning member or the body is provided with a coupling member corresponding to the first chute or the second chute, and the second chute is provided at the first positioning member or the second positioning member.

13. The positioning device according to claim 1, wherein two or all of the first object, the second object and the third object are electrically connected to each other.

14. A method of use of a positioning device, using the positioning device of claim 1, the method of use comprising:
disposing the body on the first object;
configuring the second object to laterally push away or cross the second positioning member so as to be arranged on the first positioning member;
moving the first positioning member so that the second object is arranged on the body; and
configuring the third object to laterally push away or cross the second positioning member so as to be arranged on the first positioning member.

15. The positioning device according to claim 1, further comprising:
an elastic member, having two ends respectively pressing against the body and the first positioning member or the second positioning member, so that the first positioning member or the second positioning member reciprocally moves horizontally or moves rotationally relative to the body.

16. The positioning device according to claim 1, wherein each of the first positioning member and the second positioning member presses against the body by an elastic member; alternatively, when the first positioning member or the second positioning member drives the second positioning member or the first positioning member to move, elasticity of an elastic member of the first positioning member or the second positioning member is resisted; alternatively, when a second object is arranged on the body, the first positioning member and the second positioning member are simultaneously elastically restored by corresponding elastic members, so as to clamp the second object between the body and the first positioning member; alternatively, once a third object is arranged on the first positioning member, the second positioning member is elastically restored by a corresponding elastic member, or so as to clamp the third object between the first positioning member and the second positioning member.

17. The positioning device according to claim 1, wherein once a second object and a third object are positioned at the positioning device, the second positioning member is adapted to resist elasticity and thus moves, so that the third object can be removed from the positioning device; alternatively, once the third object is removed from the positioning device, the second positioning member and the first positioning member are adapted to resist elasticity and thus move simultaneously, so that the second object can be removed from the positioning device.

18. A method of use of a positioning device, using the positioning device of claim 1, the method comprising: disposing the body on the first object; moving the first positioning member and driving the second positioning member so as to arrange the second object on the body; or separately moving the second positioning member so as arrange the third object on the first positioning member.

19. A method of use of a positioning device, using the positioning device of claim 1, the method comprising: disposing the body on the first object; moving the second positioning member and driving the first positioning member so as to arrange a second object on the body; or separately moving the second positioning member so as to arrange a third object on the first positioning member.

20. The method of use of a positioning device according to claim 19, wherein once the third object is arranged on the first positioning object, the second positioning object returns to a positioning position so as to position the third object.

21. The positioning device of claim 1, wherein the first object, the second object or the third object is a printed circuit board (PCB), a circuit board, a chip, a heat sink, a cooling fin, a connector, an iron part or a plastic part.

22. A positioning device, comprising:
a body adapted to be disposed on a first object;
a first positioning member independently mounted on the body and movable with respect to the body;
a second positioning member independently mounted on the body and movable with respect to the body;
a first elastic assembly comprising a first sleeve protrusion arranged at the first positioning member; and
a second elastic assembly comprising a second sleeve protrusion arranged at the second positioning member,
wherein the first positioning member and the second positioning member are independently movable relative to each other on the body,
wherein a second object is adapted to cross the second positioning member and the first positioning member so as to arrange the second object on the body, and a third object is adapted to cross the second positioning member and be arranged on the first positioning member, and
when one end of the second object is positioned into a first recess of the first positioning member and one end of the third object is positioned into a second recess of the second positioning member, the first recess and the second recess are aligned with each other along a direction normal to a bottom wall of the body.

23. A positioning system including a positioning device and multiple objects, comprising:
a body adapted to be disposed on a first object,
a first positioning member independently mounted on the body and laterally movable with respect to the body,
a second positioning member independently mounted on the body and laterally movable with respect to the body,
a second object adapted to cross the second positioning member and the first positioning member, and to be arranged on the body and in contact therewith, and
a third object adapted to cross the second positioning member, and to be arranged on the first positioning member and in contact therewith,
wherein the first positioning member is located between the second positioning member and a bottom wall of the body, and the first positioning member and the second positioning member are independently movable relative to each other on the body,
when one end of the second object is positioned into a first recess of the first positioning member and one end of the third object is positioned into a second recess of the second positioning member, the first recess and the second recess are aligned with each other along a direction normal to the bottom wall.

24. A positioning system including a positioning device and multiple objects, comprising:
a body adapted to be disposed on a first object,
a first positioning member independently mounted on the body and movable with respect to the body,
a second positioning member independently mounted on the body and movable with respect to the body,
a first elastic assembly comprising a first sleeve protrusion arranged at the first positioning member,
a second elastic assembly comprising a second sleeve protrusion arranged at the second positioning member,

US 12,692,885 B2

17 a second object adapted to cross the second positioning member and the first positioning member, and to be arranged on the body and in contact therewith, and a third object adapted to cross the second positioning member, and to be arranged on the first positioning member and in contact therewith, wherein the first positioning member and the second positioning member are independently movable relative to each other on the body, when one end of the second object is positioned into a first recess of the first positioning member and one end of the third object is positioned into a second recess of the second positioning member, the first recess and the second recess are aligned with each other along a direction normal to a bottom wall of the body.

\* \* \* \* \*